(12) United States Patent
Kuramashi et al.

(10) Patent No.: US 10,662,853 B2
(45) Date of Patent: May 26, 2020

(54) ENGINE EXHAUST DEVICE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/469,926

(22) PCT Filed: Dec. 1, 2017

(86) PCT No.: PCT/JP2017/043296
§ 371 (c)(1),
(2) Date: Jun. 14, 2019

(87) PCT Pub. No.: WO2018/110324
PCT Pub. Date: Jun. 21, 2018

(65) Prior Publication Data
US 2019/0316510 A1 Oct. 17, 2019

(30) Foreign Application Priority Data
Dec. 16, 2016 (JP) ................. 2016-244421

(51) Int. Cl.
*F01N 13/00* (2010.01)
*B01D 53/94* (2006.01)
(Continued)

(52) U.S. Cl.
CPC ............ *F01N 13/009* (2014.06); *B01D 53/94* (2013.01); *F01N 3/28* (2013.01); *F01N 13/08* (2013.01); *F01N 2410/12* (2013.01)

(58) Field of Classification Search
CPC ........ F01N 3/28; F01N 13/08; F01N 2410/12; F01N 13/009; B01D 53/94
(Continued)

(56) References Cited

U.S. PATENT DOCUMENTS

2012/0198838 A1  8/2012  Bruck et al.
2013/0115145 A1  5/2013  Umemoto et al.
(Continued)

FOREIGN PATENT DOCUMENTS

DE  102014206907 A1  10/2015
DE  102015107083 A1  11/2015
(Continued)

OTHER PUBLICATIONS

International Search Report issued in PCT/JP2017/043296; dated Feb. 2, 2018.

*Primary Examiner* — Tom P Duong
(74) *Attorney, Agent, or Firm* — Studebaker & Brackett PC

(57) ABSTRACT

An engine exhaust device includes: a first catalyst; a second catalyst; and a connecting member shaped into a tube and forming a part of the exhaust path, and connecting the first catalyst to the second catalyst. A downstream end surface of the first catalyst and an upstream end surface of the second catalyst form a dihedral angle within a range from 60 degrees to 120 degrees. A part of the upstream end surface of the second catalyst is close to and faces a part of a side surface of the first catalyst. On a cross-section including a central axis of the first catalyst and being parallel to a central axis of a second catalyst, a length of the part of the side surface of the first catalyst is longer than or equal to 10% and shorter than 50% of an entire length of the first catalyst.

6 Claims, 15 Drawing Sheets

(51) Int. Cl.
*F01N 3/28* (2006.01)
*F01N 13/08* (2010.01)

(58) Field of Classification Search
USPC .................................. 422/168, 177, 180
See application file for complete search history.

(56) References Cited

U.S. PATENT DOCUMENTS

2014/0090364 A1    4/2014  Bruck et al.
2015/0330279 A1*  11/2015  Melecosky ........ B01D 53/9477
                                                           60/299

FOREIGN PATENT DOCUMENTS

| | | | |
|---|---|---|---|
| EP | 1612383 A2 * | 1/2006 | ........... F01N 3/2892 |
| JP | 2011-117409 A | 6/2011 | |
| JP | 2012-529592 A | 11/2012 | |
| JP | 2016-125475 A | 7/2016 | |
| JP | 2016-148259 A | 8/2016 | |
| WO | 2010/142647 A1 | 12/2010 | |
| WO | 2013/069115 A1 | 5/2013 | |

* cited by examiner

ENGINE EXHAUST DEVICE

TECHNICAL FIELD

The present disclosure relates to an engine exhaust device.

BACKGROUND ART

A plurality of catalysts for purifying exhaust gas are conventionally arranged in series upstream of an exhaust path with a high exhaust gas temperature of a vehicle engine, such as a diesel engine or a gasoline engine.

It is known that, at this time, one or more of the catalysts, which is/are located upstream in the flow of exhaust gas, is/are placed lateral to the other(s), which is/are located downstream in the flow of exhaust gas, to reduce the area for the catalysts (see, e.g., Patent Document 1).

Patent Document 1 discloses disposing a first exhaust gas treatment unit substantially perpendicular to a second exhaust gas treatment unit in a housing so that a side surface of the second exhaust gas treatment unit overlaps at least 50% of the upstream part of the first exhaust gas treatment unit.

CITATION LIST

Patent Document

PATENT DOCUMENT 1: Japanese Unexamined Patent Publication (Japanese Translation of PCT Application) No. 2012-529592

SUMMARY OF THE INVENTION

Technical Problem

However, in Patent document 1, the exhaust gas, which has passed through the second exhaust gas treatment unit, flows into the first exhaust gas treatment unit. At this time, it is difficult to obtain a uniform flow of exhaust gas between the overlap and the other positions. This may reduce the efficiency in using the first exhaust gas treatment unit at the overlap. In addition, the overlap causes a non-uniform flow of exhaust gas, which may increase the flow rate of the exhaust gas in some positions, in which the flow resistance may increase to decrease the output. Further, the overlap is so small that the mountability of control devices such as various sensors may decrease in a space between the first and second exhaust gas treatment units.

It is an object of the present disclosure to provide a compact engine exhaust device including a plurality of catalysts and exhibiting excellent efficiency in use, function, and performance of a catalyst, and mountability of control devices.

Solution to the Problem

In order to achieve the object, the present disclosure is directed to the following engine exhaust device, including a plurality of catalysts. A part of a side surface of a first catalyst is close to and faces a part of an upstream end surface of a second catalyst. The part of the side surface of the first catalyst has a length shorter than a predetermined range.

Specifically, an engine exhaust device according to a first aspect of the present disclosure includes: a first catalyst provided in an exhaust path of the engine to purify exhaust gas discharged from the engine; a second catalyst placed downstream of the first catalyst in a flow of the exhaust gas to purify the exhaust gas, which has passed through the first catalyst; and a connecting member shaped into a tube and forming a part of the exhaust path, and connecting the first catalyst to the second catalyst. A downstream end surface of the first catalyst and an upstream end surface of the second catalyst form a dihedral angle within a range from 60 degrees to 120 degrees. A part of the upstream end surface of the second catalyst is close to and faces a part of a side surface of the first catalyst. On a cross-section including a central axis of the first catalyst and being parallel to a central axis of a second catalyst, a length of the part of the side surface of the first catalyst is longer than or equal to 10% and shorter than 50% of an entire length of the first catalyst.

According to the first aspect, the part of the side surface of the first catalyst is close to and faces the part of the upstream end surface of the second catalyst. The part of the first catalyst, which is close to and faces the part of the upstream end surface of the second catalyst, has a length shorter than the predetermined range. As a result, the exhaust device achieves a compact size, and exhibits improved efficiency in use, function, and performance of a catalyst, and mountability of control devices.

According to a second aspect, in the first aspect, the connecting member includes: a first opening located upstream in the flow of the exhaust gas; a second opening located downstream in the flow of the exhaust gas; and a bend connecting the first opening to the second opening. The first catalyst is inserted in a downstream end surface of the first catalyst first into the connecting member through the first opening. The second catalyst is inserted in an upstream end surface of the second catalyst first into the connecting member through the second opening.

According to the second aspect, the first and second catalysts are inserted into the connecting member. This configuration requires no connecting flange, which is needed if the first and second catalysts are connected to the upstream and downstream ends of the connecting member. This contributes to downsizing of the exhaust device.

According to a third aspect, in the second aspect, the bend of the connecting member includes: a first wall facing the downstream end surface of the first catalyst; and a second wall smoothly connected to the first wall, and facing the upstream end surface of the second catalyst. The first wall includes: a wall transition smoothly extending from the second opening; a wall slope smoothly connected to the wall transition, and rising up toward the first catalyst; and a wall step smoothly connected to the wall slope and the second wall.

According to the third aspect, out of the first wall facing the downstream end surface of the first catalyst, the wall step continuous with the second wall facing the upstream end surface of the second catalyst protrudes more than the wall transition toward the first catalyst. This can reduce the concentrated flow of exhaust gas, which has passed through the first catalyst and reaches the wall step, toward the end of the second catalyst, at which the wall transition exists. This can also promote the flow of exhaust gas to the part of the second catalyst, which is close to and faces the part of the first catalyst. Such features improve the uniformity of the flow of exhaust gas, which has passed through the first catalyst, so that the exhaust device can exhibit improved efficiency in use, function, and performance of the second catalyst, and mountability of control devices.

According to a fourth aspect, in the third aspect, the wall step rises up with a curvature radius from the bottom of the connecting member, when the connecting member is viewed from the second opening so that the first opening is located on the right.

According to the fourth aspect, the exhaust gas, which has passed through the first catalyst, reaches the wall step and is diffused into the space inside the connecting member along the surface of the wall step curving with the curvature radius. Accordingly, the flow rate of exhaust gas to the second catalyst can be decreased. The exhaust gas, which has been diffused into the connecting member, flows into the second catalyst, thereby providing a uniform flow of exhaust gas inside the second catalyst. This can also decrease a rise in the flow resistance of the exhaust gas in the second catalyst. Accordingly, the exhaust device exhibits improved efficiency in use, function, performance of the whole catalysts including the part of the second catalyst close to and facing the part of the first catalyst, and mountability of control devices.

According to a fifth aspect, in the fourth aspect, the wall transition rises up with a curvature radius from the bottom of the connecting member, when the connecting member is viewed from the second opening so that the first opening is located on the right. The wall transition has a greater curvature radius than the wall step.

According to the fifth aspect, the exhaust gas, which has passed through the first catalyst, reaches the wall transition and is diffused into the connecting member along the gently curving wall transition. The wall transition curves more gently than the wall step. This can further decrease the flow rate of exhaust gas near the upstream end surface of the second catalyst to provide a uniform flow of exhaust gas from the inside of the connecting member into the second catalyst. This can also effectively decrease a rise in the flow resistance to allow the exhaust device to exhibit more improved efficiency in use, function, and performance of the second catalyst, and mountability of control devices.

According to a sixth aspect, in any one of the third to fifth aspects, the connecting member includes: a first connecting member provided with the first opening and a part of the second opening closer to the first opening; and a second connecting member provided with the other part of the second opening. The first wall and the second wall are provided in the second connecting member.

According to the sixth aspect, the connecting member is divided into the first and second connecting members to be molded. This can achieve accurate molding of the connecting member in a complicated shape. In addition, the first and second walls, which guide the flow of exhaust gas, are formed in the second connecting member. This configuration can provide a smooth wall surface without forming any division on the walls, thereby reducing the turbulence of the exhaust gas. A part of the second opening closer to the first opening is connected from the first opening through a wall surface of the bend bending with a small curvature radius. Thus, the stress tends to concentrate on the surface of the bend. The division between the first and second connecting members is formed away from such a position, in which the stress tends to concentrate. This can improve the durability of the connecting member.

Advantages of the Invention

As described above, the engine exhaust device according to the present disclosure achieves a compact size, and exhibits improved efficiency in use, function, and performance of a catalyst, and mountability of control devices.

DESCRIPTION OF EMBODIMENTS

An embodiment of the present disclosure will now be described in detail with reference to the drawings. The following description of a preferred embodiment is merely an example in nature, and is not intended to limit the scope, applications or use of the present disclosure.

First Embodiment

<Engine>

An engine E, to which an exhaust gas purifier 1 (an engine exhaust device) according to a first embodiment is applied, is an inline-four gasoline engine mounted in a vehicle. The engine E is horizontally placed in the front of an FF vehicle.

Note that the engine, to which the exhaust gas purifier 1 according to the first embodiment is applied, is not limited to the four-cylinder gasoline engine. The purifier is also applicable to any other engine such as a multi-cylinder engine or a diesel engine. The engine is applicable not only to the FF vehicle, but also to any other vehicle, such as an FR vehicle, an MR vehicle, an RR vehicle, a 4WD vehicle, or a motorcycle, which employs various layouts.

Figure 1:
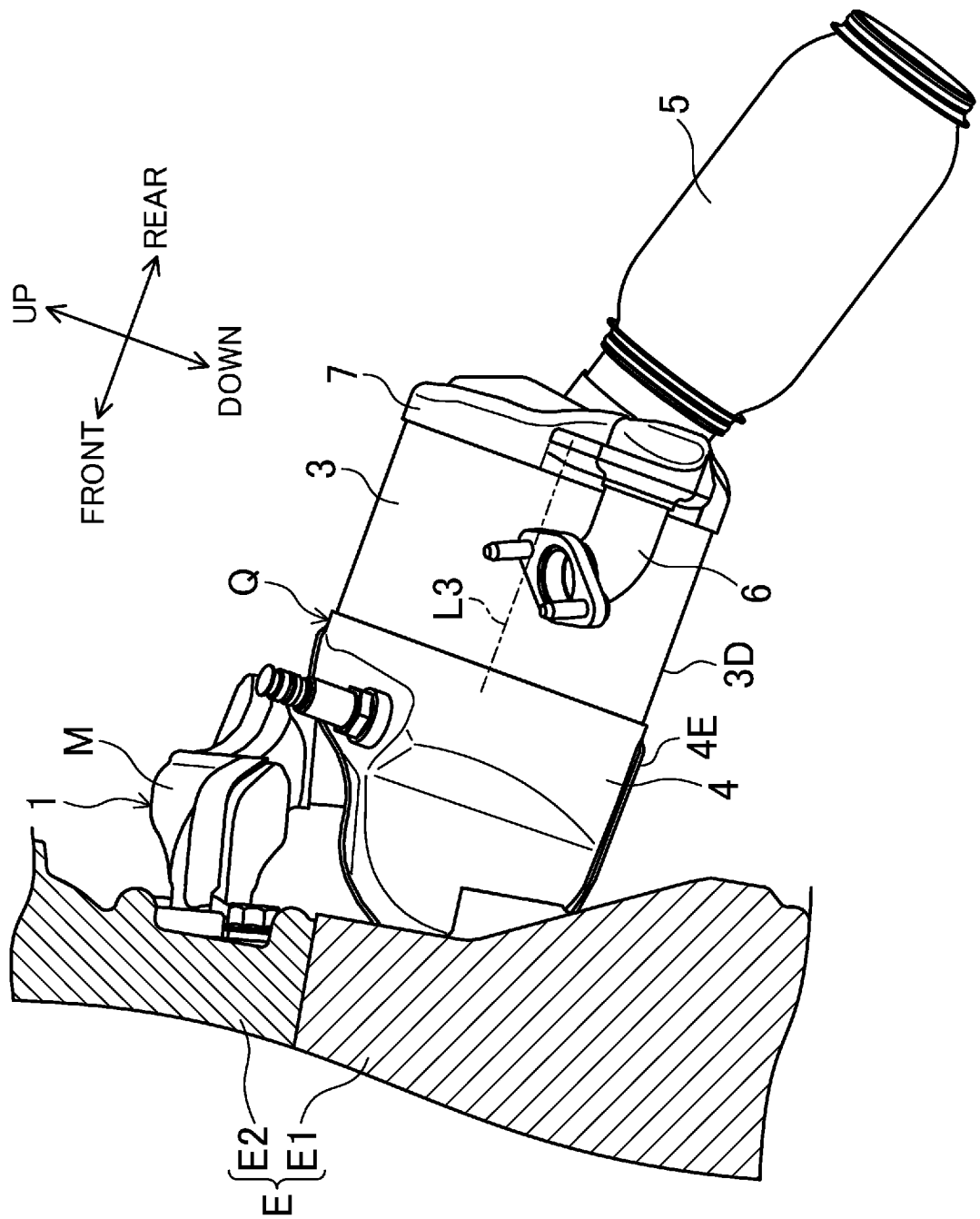
FIG. 1 is a side view schematically illustrating that an exhaust gas purifier according to a first embodiment is attached to an engine.

As shown in FIG. 1, the engine E includes a cylinder block E1 and a cylinder head E2. Although not shown in detail, first to fourth cylinders, which are defined by the cylinder block E1 and the cylinder head E2, are arranged in this order in series, perpendicular to the drawing plane of FIG. 1. For each cylinder, a cylinder bore of the cylinder block E1, a piston, and the cylinder head E2 define a combustion chamber.

The cylinder head E2 is provided with four exhaust ports (not shown), each of which is connected to a corresponding one of the four combustion chambers. Exhaust gas generated in the combustion chambers is discharged outside the vehicle through an exhaust path including the exhaust ports.

<Exhaust Path>

Figure 2:
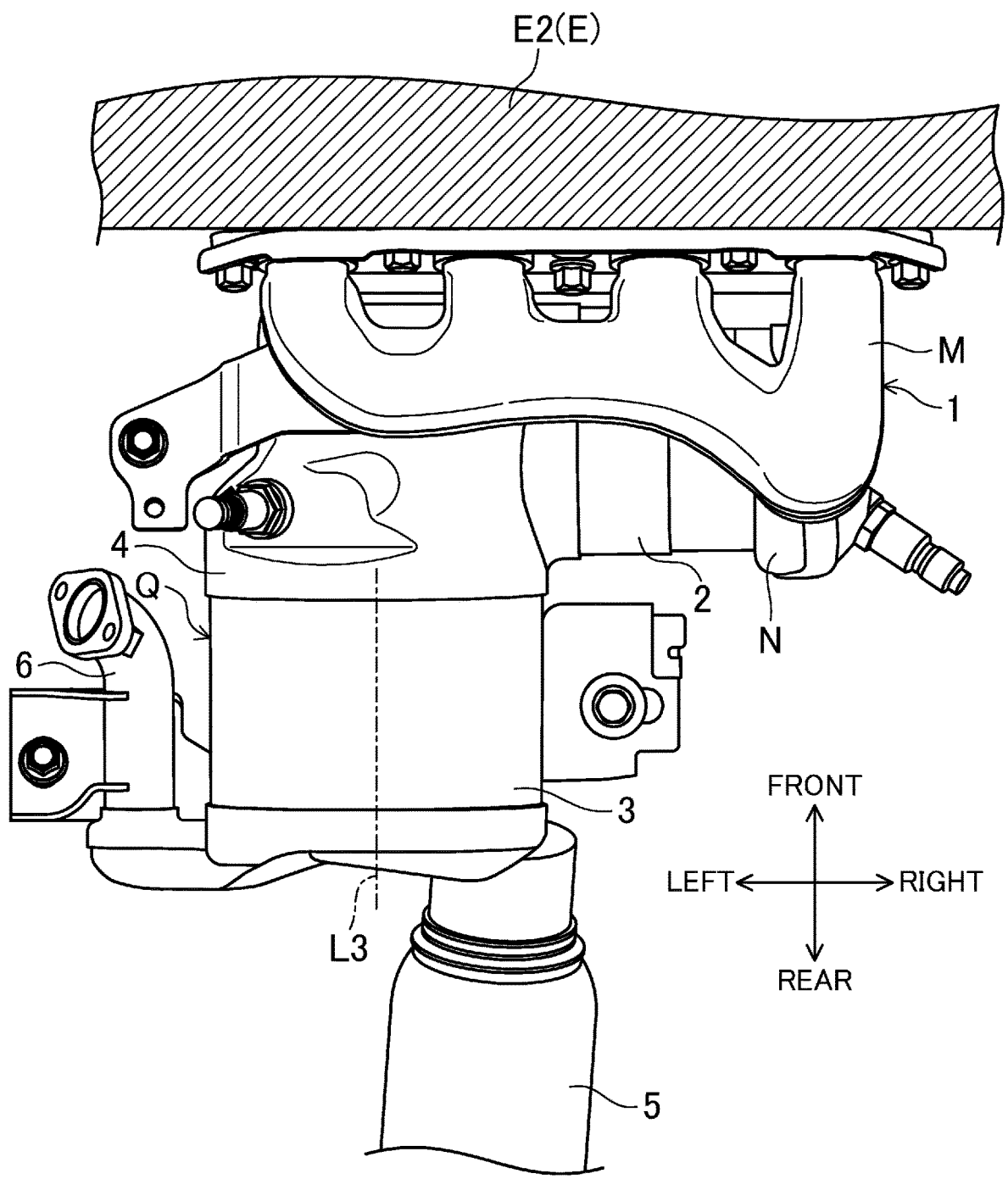
FIG. 2 is a schematic plan view of FIG. 1.

As shown in FIGS. 1 and 2, the exhaust gas purifier 1 according to this embodiment is connected to the exhaust ports. A downstream exhaust gas passage (not shown), which extends to the outside of the vehicle, is connected downstream of the exhaust gas purifier 1. In this manner, the exhaust path, to which the exhaust gas purifier 1 is applied, includes the exhaust ports, the exhaust gas purifier 1, and the downstream exhaust gas passage described above.

<Exhaust Gas Purifier>

As shown in FIGS. 1 and 2, the exhaust gas purifier 1 according to the present embodiment includes an exhaust manifold M, a connector N, and a catalytic converter Q. The exhaust manifold M is connected to the four exhaust ports of the engine E. The connector N is connected to the outlet of the exhaust manifold M. The catalytic converter Q is connected to the outlet of the connector N.

<Exhaust Manifold>

As shown in FIGS. 1 and 2, the exhaust manifold M is connected to the four exhaust ports.

As shown in FIG. 2, the exhaust manifold M is for collecting the exhaust gas discharged from the four combustion chambers through the respective exhaust ports. Independent exhaust pipes, each of which is connected to a corresponding one of the four exhaust ports, are assembled in the right of the exhaust manifold M. The exhaust gas collected in the exhaust manifold M is fed into the catalytic converter Q via the connector N connected to the outlet of the exhaust manifold M.

<Connector>

The connector N is a tubular member for guiding the exhaust gas, which has been fed from the exhaust manifold M disposed above the catalytic converter Q, to the catalytic converter Q. In this embodiment, the connector N is an L-shaped tubular member curving from above to the left.

<Directions>

In the description of the present specification, the cylinder head E2 is located above and the cylinder block E1 is located below in the "vertical direction," and the engine E is located at the front and the exhaust manifold M is located at the rear in the "longitudinal direction," as shown in FIG. 1, with reference to the engine E. On the other hand, as shown in FIG. 2, in a "horizontal direction," the cylinders are arranged with reference to the engine E. In other words, the "horizontal direction" is perpendicular to the drawing plane of FIG. 1. The front is the left and the back is the right. Further, the expressions "upstream" and "downstream" are used with reference to the flow of exhaust gas discharged from the combustion chambers through the respective exhaust ports.

In this embodiment, as shown in FIG. 1, the "longitudinal direction" is parallel to the central axis L3 of a gasoline particulate filter 3 (hereinafter referred to as a "GPF 3"), which serves as a second catalyst and will be described later.

<Catalytic Converter>

Figure 3:
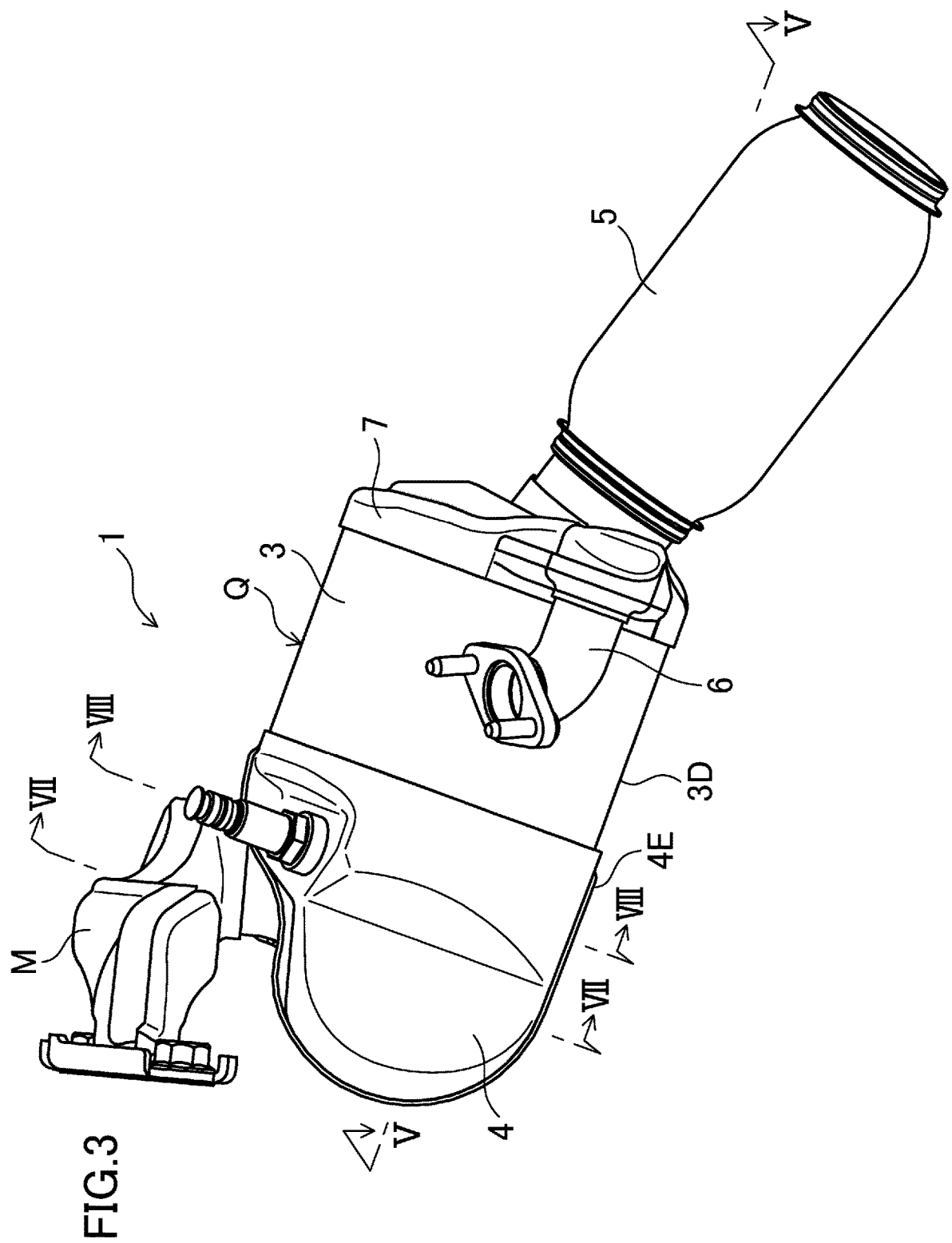
FIG. 3 is a side view of the exhaust gas purifier of FIG. 1.
Figure 4:
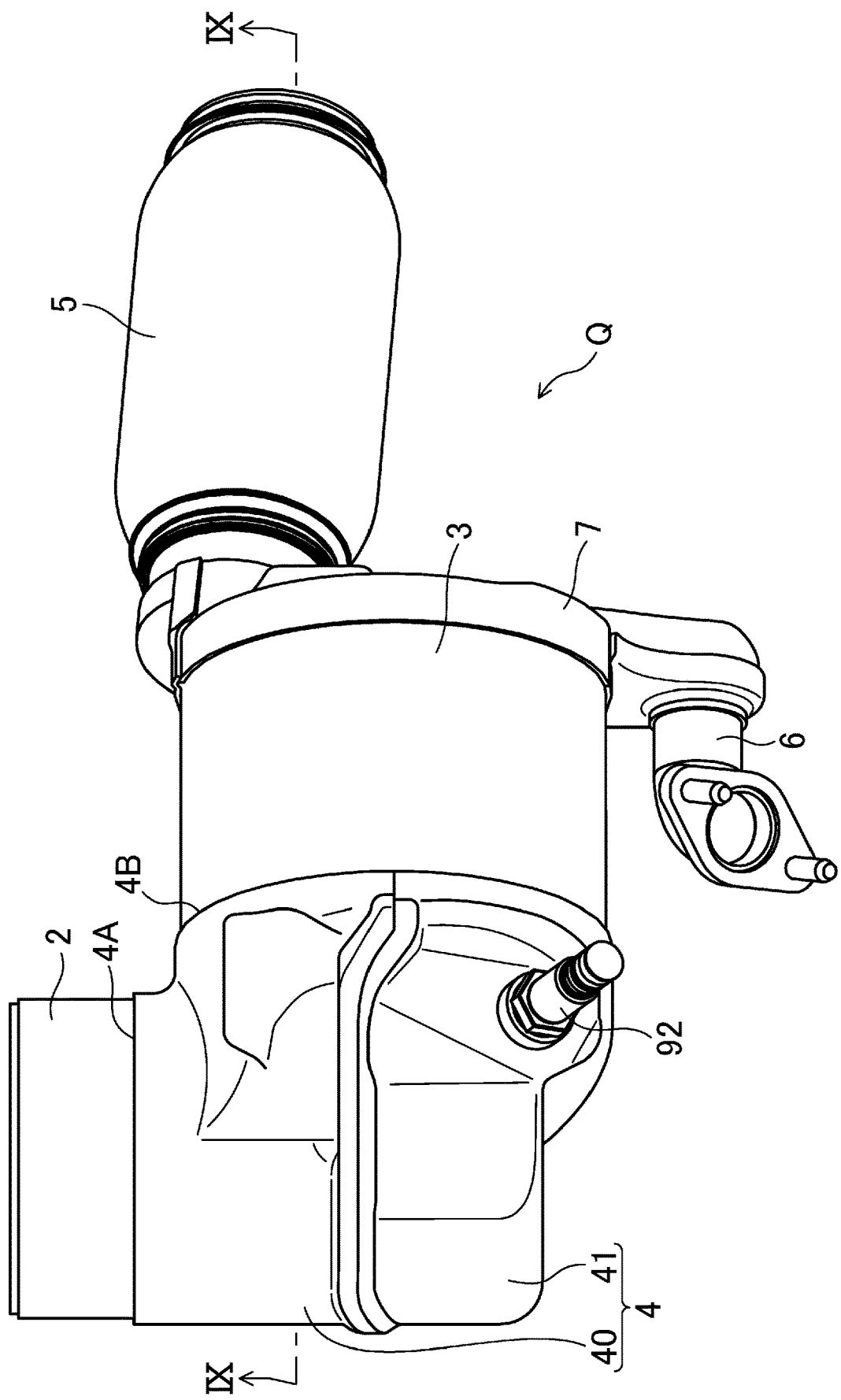
FIG. 4 is a plan view of a catalytic converter of the exhaust gas purifier of FIG. 1.

As shown in FIGS. 2 to 4, the catalytic converter Q includes a three-way catalyst 2 as a first catalyst, the GPF 3 as the second catalyst, a connecting pipe 4 as a connection member, a downstream end part 7 of the GPF, an exhaust gas outlet 5, and an outlet 6 for the EGR. The three-way catalyst 2 is connected to the outlet of the connector N. The GPF 3 is disposed downstream of the three-way catalyst 2. The connecting pipe 4 connects the three-way catalyst 2 to the GPF 3. The downstream end part 7 is provided at the downstream end of the GPF 3. The exhaust gas outlet 5 and the outlet 6 for the EGR are provided at the tip of the downstream end part 7 of the GPF.

<Three-Way Catalyst>

The three-way catalyst 2 is for purifying hydrocarbon HC, carbon monoxide CO, and nitrogen oxide NOx in the exhaust gas. Although not described in detail, examples of the three-way catalyst 2 include a catalyst obtained by coating a honeycomb carrier with a catalyst component, which is formed by supporting noble metal such as Pt, Pd, and Rh on a support material of metal oxide. The three-way catalyst 2 is not particularly limited, and may be of any known type.

Figure 5:
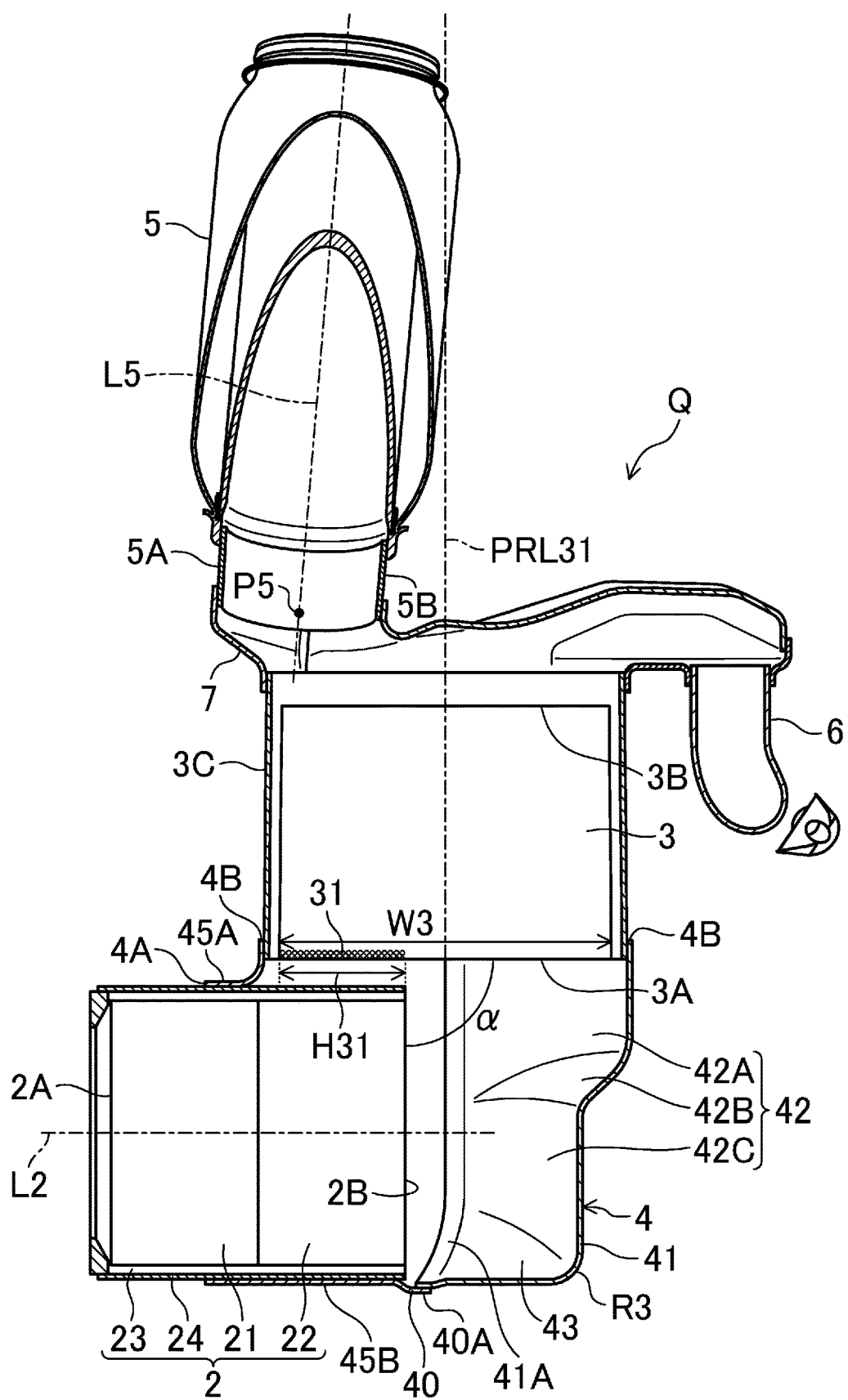
FIG. 5 is a cross-sectional view taken along line V-V of FIG. 3.
Figure 9:
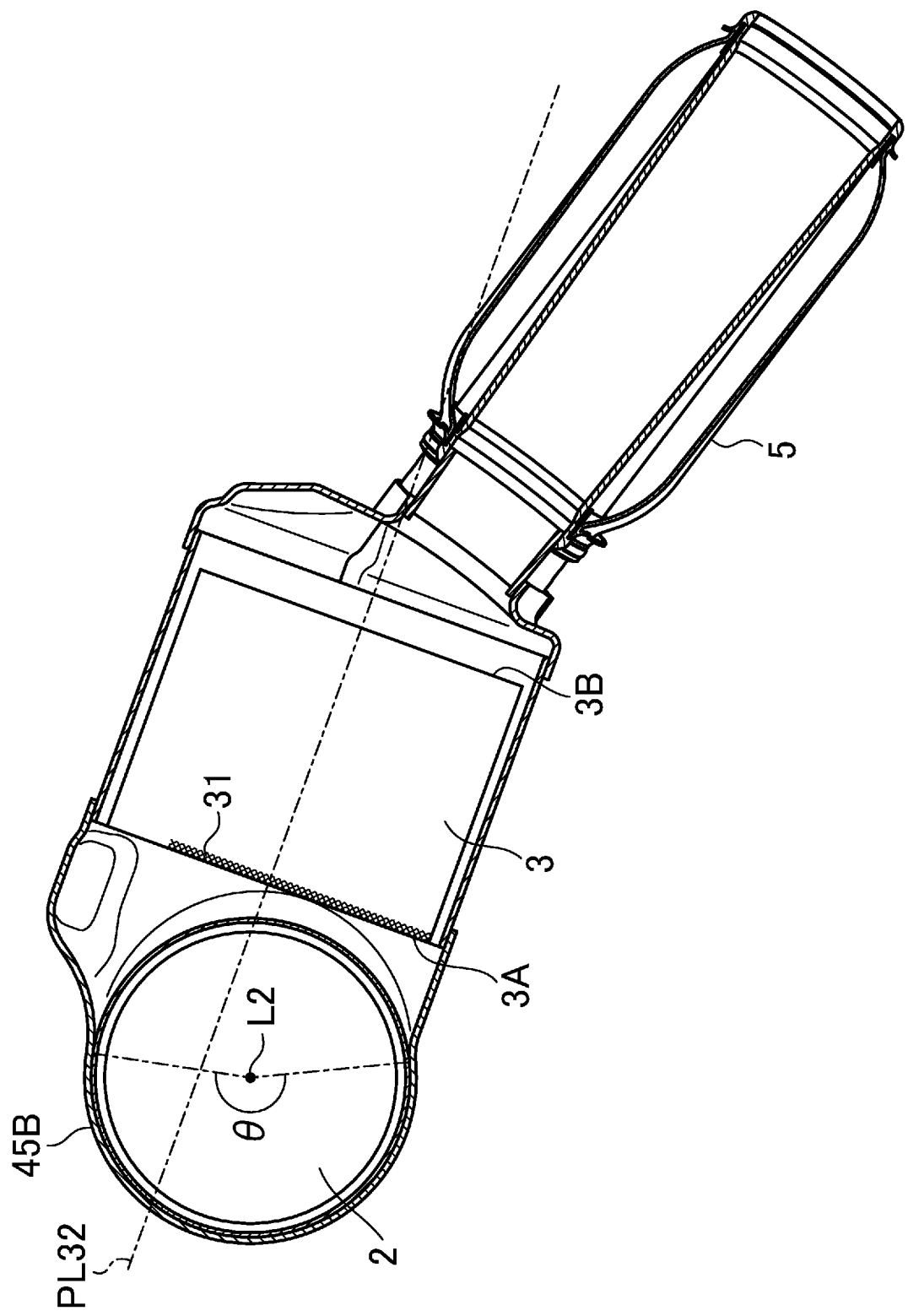
FIG. 9 is a cross-sectional view taken along line IX-IX of FIG. 4.

As shown in FIGS. 5 and 9, the three-way catalyst 2 is a cylindrical catalyst with a central axis L2. Although not particularly limited, the three-way catalyst 2 has a cylindrical shape in one preferred embodiment in view of easily disposing in the three way catalyst 2 in the exhaust path and obtaining a uniform flow of exhaust gas. The cross-sectional shape of the three-way catalyst 2, which is perpendicular to the central axis L2 of the three-way catalyst, is not particularly limited. Any shape such as a completely round, oval, rectangular, or polygonal shape may be employed. However, the three-way catalyst 2 may have a completely round or oval cross-sectional shape in one preferred embodiment, in view of obtaining a uniform flow of exhaust gas and reducing manufacturing costs.

Figure 7:
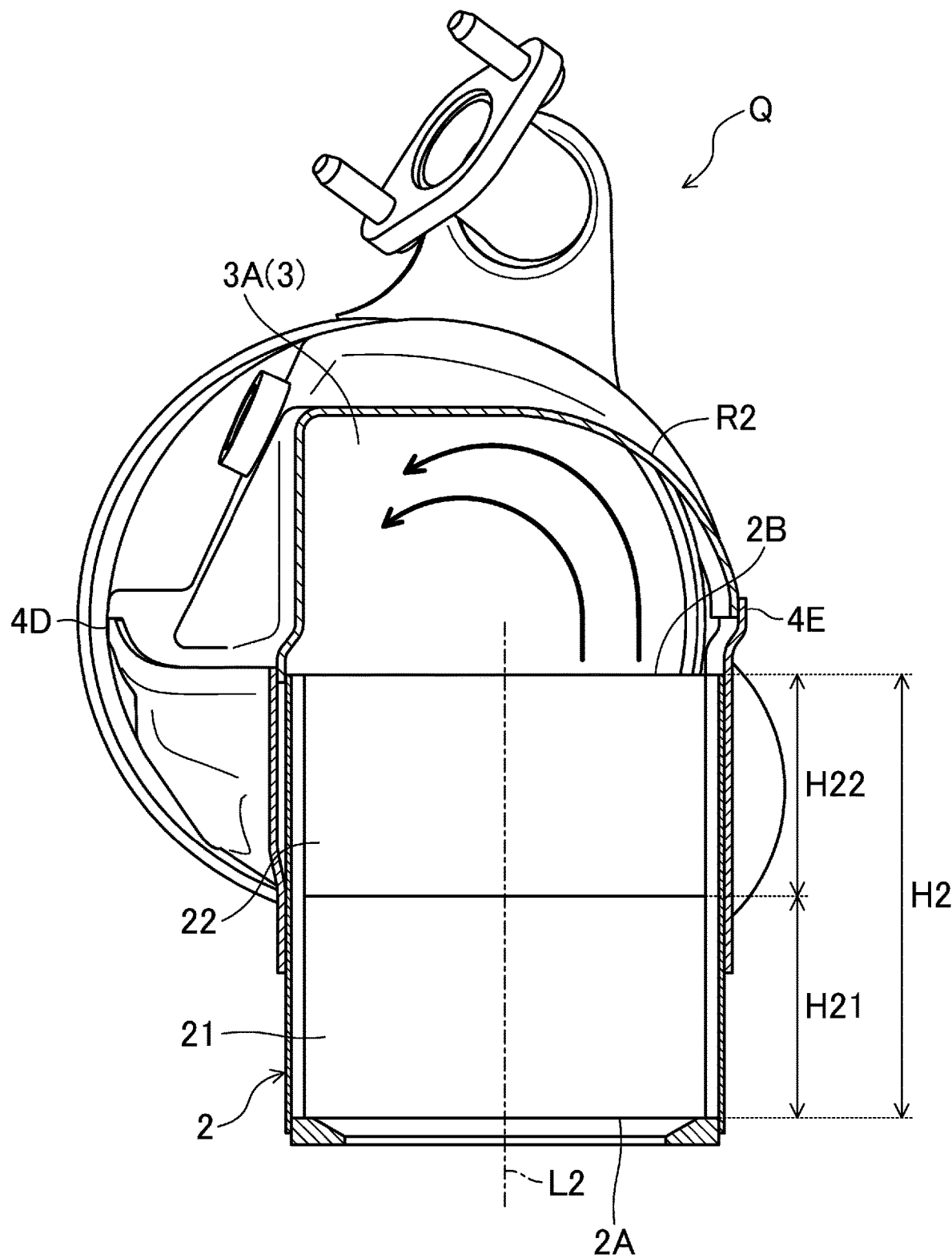
FIG. 7 is a cross-sectional view taken along line VII-VII of FIG. 3.

As shown in FIG. 7, the surface of the three-way catalyst 2 located at the upstream end is referred to an upstream end surface 2A of the three-way catalyst (i.e., the upstream end surface of the first catalyst). The surface of the three-way catalyst 2 located at the downstream end is referred to a downstream end surface 2B of the three-way catalyst (i.e., the downstream end surface of the first catalyst). The upstream and downstream end surfaces 2A and 2B of the three-way catalyst are in a circular shape with the same diameter.

Figure 8:
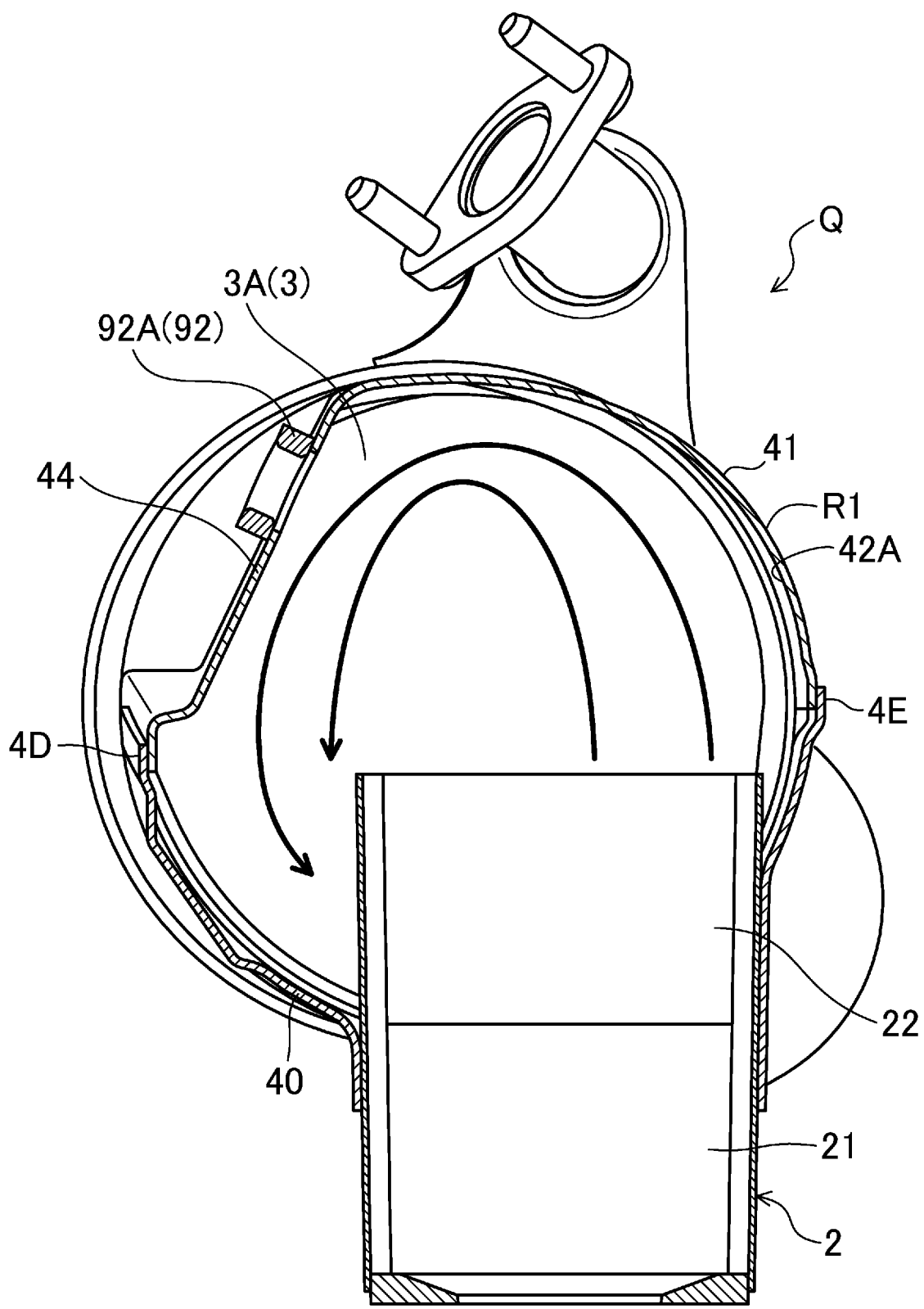
FIG. 8 is a cross-sectional view taken along line VIII-VIII of FIG. 3.

As shown in FIGS. 5, 7, and 8, the three-way catalyst 2 has, as a catalyst body for purifying exhaust gas, a two-stage structure. A front stage 21 is located closer to the upstream end of the three-way catalyst, while a rear stage 22 is located closer to the downstream end of the three-way catalyst. The front stage 21 serves as a three-way catalyst with an excellent low-temperature activity for purifying low-temperature exhaust gas, for example, during a low-load operation of the engine E. On the other hand, the rear stage 22 serves as a three-way catalyst with an excellent high-temperature activity for purifying high-temperature exhaust gas, for example, during a high-load operation. In this embodiment, the three-way catalyst 2 has the two-stage structure of the front and rear stages 21 and 22, but is not limited thereto. The three-way catalyst 2 may be a single catalyst, or may have a multi-stage structure that is divided into three or more stages.

As shown in FIG. 7, assume that the entire length of the three-way catalyst 2 in the longitudinal direction, that is, parallel to the central axis L2 of the three-way catalyst is H2. Then, the ratio H21/H22 of the length H21 of the front stage 21 to the length H22 of the rear stage 22 is about 1. The length ratio H21/H22 of the front stage 21 to the rear stage 22 is variable in accordance with, for example, the type of the engine E. However, the ratio falls within a range from 0.50 to 2.0 in one preferred embodiment, and from 0.75 to 1.25 in one more preferred embodiment, in view of obtaining an excellent catalytic performance of the three-way catalyst 2.

As shown in FIG. 7, the tip of the three-way catalyst 2 including the upstream end surface 2A, that is, the tip of the front stage 21 protrudes beyond the connecting pipe 4.

Serving as the catalyst suitable for purifying low-temperature exhaust gas, the front stage 21 is more likely to be influenced by a thermal damage when exposed to high-temperature exhaust gas. Protruding outside from the inside of the connecting pipe 4, the front stage 21 is not exposed to the high-temperature exhaust gas, which has been diffused into the connecting pipe 4, even in a high-load operation. This effectively prevents or reduces deterioration of the front stage 21 due to the heat damage, thereby reducing the risk of the heat damage to the whole three-way catalyst 2.

The whole or only a part of the front stage 21 may protrude beyond the connecting pipe 4. In addition, the degree of protrusion is adjustable in accordance with the length H21 of the front stage 21. The degree of protrusion of the front stage 21 falls within a range from 50% to 100% in one preferred embodiment, from 60% to 95% in one more preferred embodiment, and from 70% to 90% in one particularly preferred embodiment, of the length H21 of the front stage, in view of preventing or reducing the thermal damage of the catalyst with an excellent low-temperature activity.

With the use of a three-way catalyst having an excellent high-temperature activity, the rear stage 22 may also or, does not have to, protrude beyond the connecting pipe 4. Considering that the rear stage 22 exhibits excellent performance of purifying high-temperature exhaust gas, the whole rear stage 22 is inserted into the connecting pipe 4 in one preferred embodiment, in view of downsizing the exhaust gas purifier 1.

As shown in FIG. 5, the three-way catalyst 2 includes a catalyst mat 23 and a catalyst case 24. The catalyst mat 23 covers the entire outer peripheries of the front and rear stages 21 and 22 as a main body of the catalyst. The catalyst case 24 covers the entire outer periphery of the catalyst mat 23.

The exhaust gas has a low temperature around 400° C. at a low load, and a high temperature around 800° C. at a high load. Then, being always exposed to the high-temperature exhaust gas, which has passed through the three-way catalyst 2, the three-way catalyst 2 may be degraded by a thermal damage.

The catalyst mat 23 is for holding the front and rear stages 21 and 22 as the main body of the catalyst even under an environment in which the three-way catalyst 2 is exposed to high-temperature exhaust gas, and made of a material, such as ceramic, with a high heat resistance and a high heat retention. The thickness depends on, for example, the size of the three-way catalyst 2 or the material of the catalyst mat 23, and is not particularly limited. However, the thickness may fall, for example, within a range from 2.0 mm to 8.0 mm, from 3.0 mm to 5.0 mm in one preferred embodiment, and from 3.6 mm to 4.0 mm in one more preferred embodiment, in view of preventing or reducing a thermal damage of the three-way catalyst 2. With a thickness smaller than 2.0 mm, the three-way catalyst 2 tends to have difficulty in exhibiting sufficient holding performance, heat resistance, and heat retention. A thickness larger than 8.0 mm may cause higher manufacturing costs or difficulty in keeping a sufficient space for mounting control devices.

The catalyst case 24 is for holding the front and rear stages 21 and 22 of the three-way catalyst 2 and the catalyst mat 23, and made of, for example, metal such as iron or stainless steel. Note that the catalyst mat 23 and the catalyst case 24 may be of any known type.

<GPF>

The GPF 3 is a filter disposed downstream of the three-way catalyst 2 to trap particulate matter (hereinafter referred to as "PM") in the exhaust gas, which has passed through the three-way catalyst 2. Although not described in detail, the GPF 3 is, for example, a sealed honeycomb carrier, which additionally has a filter function and is coated with a catalyst to promote combustion of the PM deposited on the filter. The PM in the exhaust gas is adsorbed onto the surface of a partition wall of the GPF 3. Once the PM is deposited, a post injection for injecting fuel is performed after the main injection to increase the temperature to the temperature for the PM combustion, thereby incinerating the PM deposited on the GPF 3. The GPF 3 is not particularly limited and may be of any known type.

As shown in FIGS. 1 and 2, the GPF 3 is a cylindrical catalyst with a central axis L3. Although the shape of the GPF 3 is not particularly limited, the GPF 3 may have a cylindrical shape in one preferred embodiment, in view of easily disposing the GPF 3 in the exhaust path and obtaining a uniform flow of exhaust gas. The cross-sectional shape of the GPF 3, which is perpendicular to the central axis L3 of the GPF, is not particularly limited. Any shape such as a completely round, oval, rectangular, or polygonal shape may be employed. However, the GPF 3 may have a completely round or oval cross-sectional shape in one preferred embodiment, in view of obtaining a uniform flow of exhaust gas and reducing manufacturing costs.

As shown in FIG. 9, the surface of the GPF 3 located at the upstream end is referred to an upstream end surface 3A of the GPF (i.e., the upstream end surface of the second catalyst). The surface of the GPF 3 located at the downstream end is referred to a downstream end surface 3B of the GPF (i.e., the downstream end surface of the second catalyst). The upstream and downstream end surfaces 3A and 3B of the GPF are in a circular shape with the same diameter.

Like the three-way catalyst 2, the GPF 3 includes a catalyst main body, a catalyst mat, and a catalyst case. The catalyst main body of the GPF is for purifying the exhaust gas. The catalyst mat of the GPF covers the entire outer periphery of the catalyst main body of the GPF. The catalyst case of the GPF covers the entire outer periphery of the catalyst mat of the GPF. The catalyst mat and the catalyst case of the GPF are used for the same or a similar purpose as the catalyst mat 23 and the catalyst case 24 described above, and may have the same or similar configurations as those described above.

<Connecting Pipe>

The connecting pipe 4 is a tubular member for connecting the three-way catalyst 2 to the GPF 3, and forms a part of the exhaust path.

Figure 10:
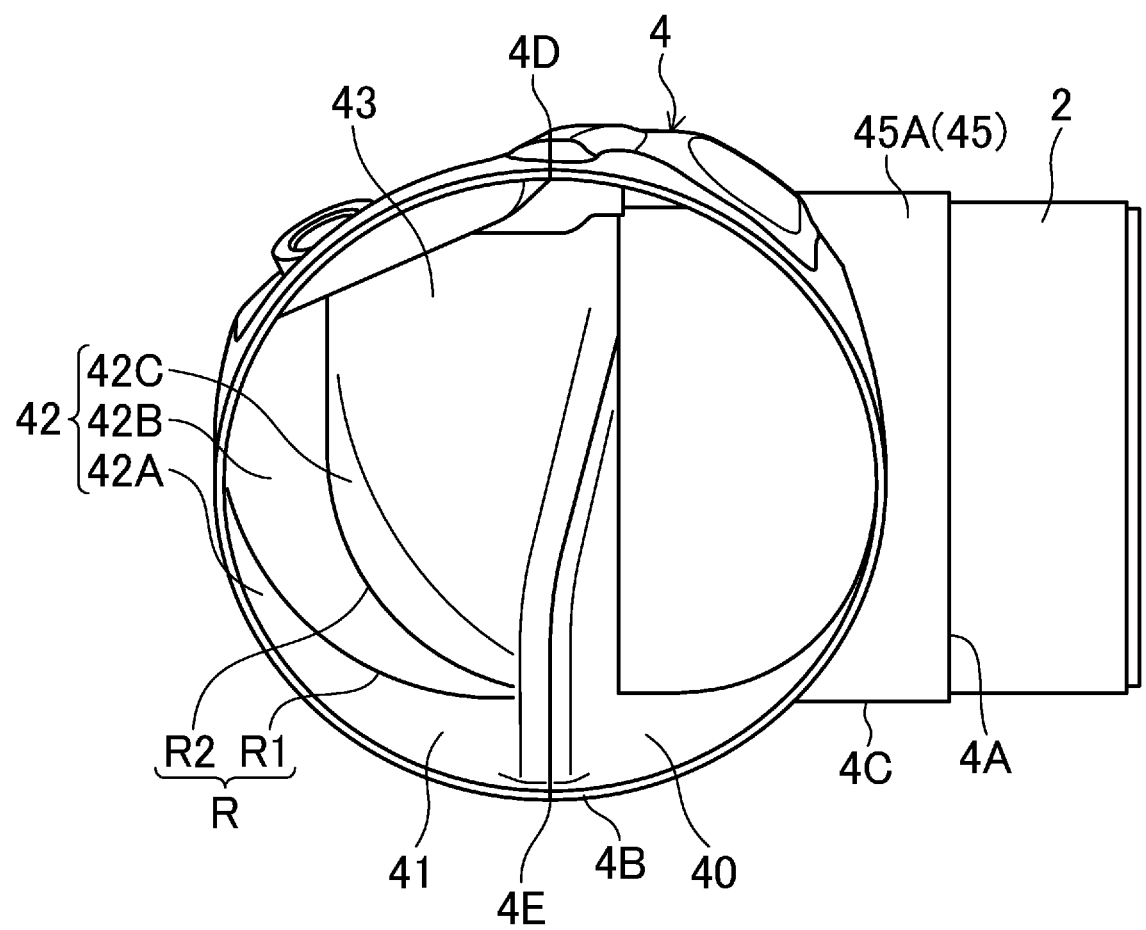
FIG. 10 illustrates a connecting pipe, into which a three-way catalyst is inserted, as seen from a second opening.

As shown in FIG. 10, the connecting pipe 4 includes a first opening 4A at the upstream end, a second opening 4B at the downstream end, and a bend 4C connecting the first opening 4A to the second opening 4B.

As shown in FIG. 10, the three-way catalyst 2 is inserted in the downstream end surface 2B first into the connecting pipe 4 through the first opening 4A. On the other hand, for example, as shown in FIG. 5, the GPF 3 is inserted in the upstream end surface 3A first into the connecting pipe 4 through the second opening 4B. The configuration, in which the three-way catalyst 2 and the GPF 3 are inserted into the connecting member 4, requires, for example, no connecting flange, which is needed if the three-way catalyst 2 and the GPF 3 are connected to the upstream and downstream ends of the connecting member 4. This contributes to downsizing of the exhaust gas purifier 1.

—Relative Arrangement Between Three-Way Catalyst and GPF—

FIG. 9 is a cross-sectional view taken along line IX-IX of FIG. 4. The cross-section, which is perpendicular to the central axis L2 of the three-way catalyst 2 and passes through the GPF 3 and the exhaust gas outlet 5, is viewed from the left. The cross-section shown in FIG. 9 is hereinafter referred to as an "IX-IX section" (longitudinal section). The line indicated by reference numeral PL32 in FIG. 9 represents a plane that includes the central axis L3 of the GPF 3 and is parallel to the central axis L2 of the three-way catalyst 2.

As shown in FIG. 9, the central axis L2 of the three-way catalyst 2 is located below the plane PL32, that is, the central axis L3 of the GPF 3 on the IX-IX section. Accordingly, as will be described later, the exhaust manifold M can be disposed above the three-way catalyst 2 so that the exhaust gas purifier 1 can be disposed in a small area in the vehicle.

As shown in FIG. 5, the downstream end surface 2B of the three-way catalyst 2 and the upstream end surface 3A of the GPF 3 are arranged in the bend 4C to form a dihedral angle α of about 90 degrees. The dihedral angle α is not limited to this angle. However, the angle falls within a range from 60 degrees to 120 degrees in one preferred embodiment, from 70 degrees to 110 degrees in one more preferred embodiment, and from 80 degrees to 100 degrees in one particularly preferred embodiment, in view of maintaining a sufficient flow of exhaust gas from the three-way catalyst 2 to the GPF 3.

In addition, a part of the upstream end surface 3A of the GPF 3 is covered with a side surface of the three-way catalyst 2 to form an overlap 31. In other words, the overlap 31 is a part of the upstream end surface 3A of the GPF 3, which is close to and faces a part of the side surface of the three-way catalyst 2.

FIG. 5 is a cross-sectional view taken along line V-V in FIG. 3. The cross-section, which includes the central axis L2 of the three-way catalyst 2 and is parallel to the central axis L3 of the GPF 3, is viewed from above. The cross section shown in FIG. 5 is hereinafter referred to as a "V-V section" (cross-section). As shown in FIG. 5, the length H31 of the part of the side surface of the three-way catalyst 2 forming the overlap 31 is longer than or equal to 10% and shorter than 50% of the entire length H2 of the three-way catalyst 2 on the V-V section in one preferred embodiment, in view of arranging the three-way catalyst 2 and the GPF 3 in a small area and providing a uniform flow of exhaust gas within the GPF 3.

The length H31 of the side surface of the three-way catalyst 2 is 10% or longer and shorter than 50% of the width W3 of the GPF in the V-V section of FIG. 5 in one preferred embodiment, in view of arranging the three-way catalyst 2 and the GPF 3 in a small area and providing a uniform flow of exhaust gas within the GPF 3.

As described above, if the three-way catalyst 2 and the GPF 3 are arranged laterally, the first catalyst and the GPF 3 form the overlap 31, which merely expands within the range described above. This allows the exhaust gas purifier 1 to achieve a compact size and to exhibit improved efficiency in using the GPF 3, particularly in using the overlap 31.

—First and Second Connecting Members—

Figure 12:
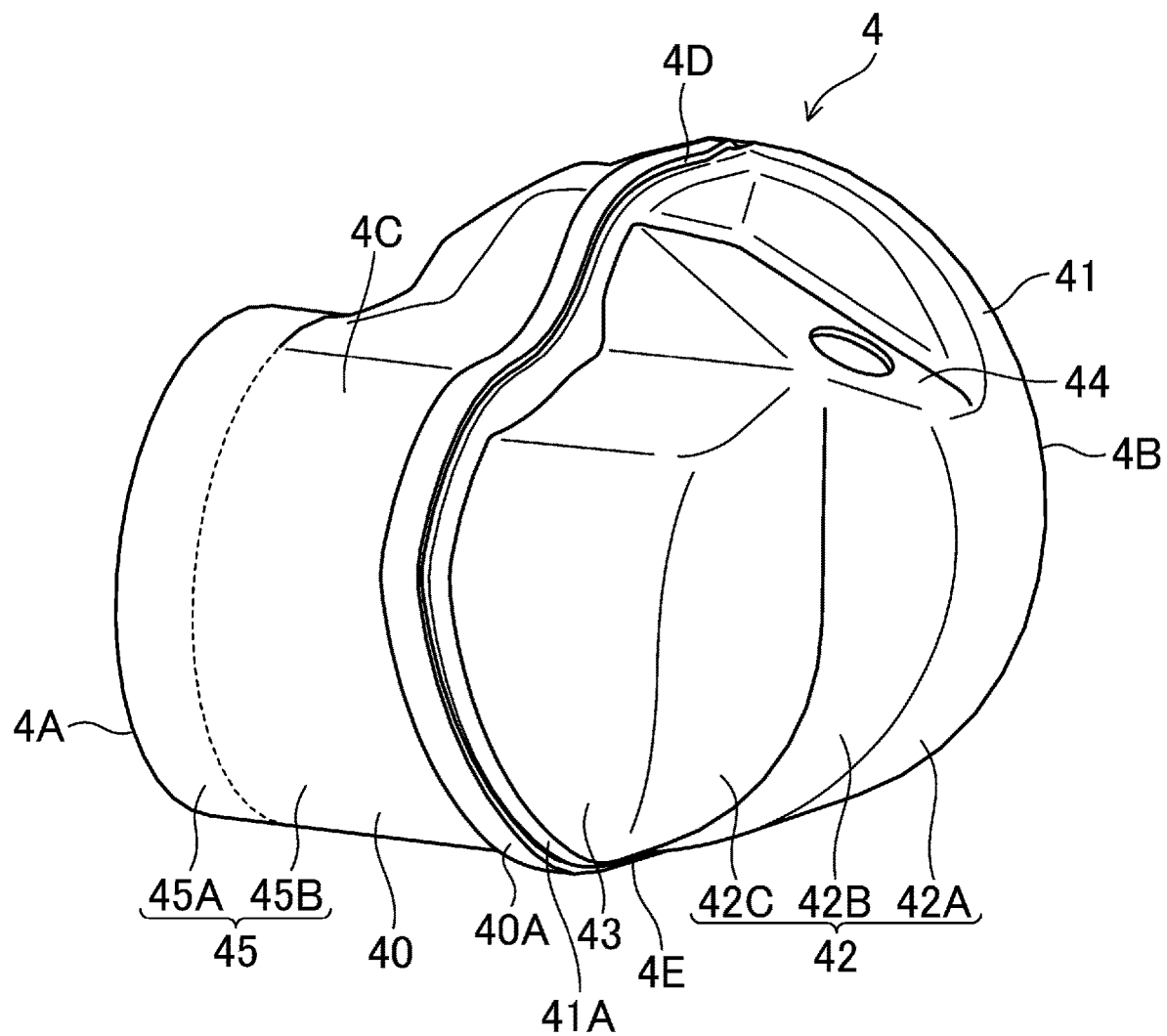
FIG. 12 is a perspective view of the connecting pipe, as seen from the upper left front.

As shown in FIGS. 10 and 12, the connecting pipe 4 includes a first connecting member 40 and a second connecting member 41.

As shown in FIG. 12, the first and second connecting members 40 and 41 include a first joint 40A and a second joint 41A, respectively, in the connecting pipe 4 near the downstream end surface 2B of the three-way catalyst 2. The first and second joints 40A and 41A are fitted to each other to form the connecting pipe 4.

As shown in FIG. 10, the first connecting member 40 is provided with the first opening 4A and a part, namely, the right half, of the second opening 4B. On the other hand, the second connecting member 41 is provided with the other part, namely, the rest left half of the second opening 4B.

In other words, the connecting pipe 4 is comprised of the two members: the first connecting member 40; and the second connecting member 41. The first opening 4A, the part of the second opening 4B, and a part of the bend 4C are provided in the first connecting member 40. Then, the rest of the second opening 4B and the rest of the bend 4C are provided in the second connecting member 41.

The connecting member 4 is divided into the first and second connecting members 40 and 41 to be molded, which allows for accurate molding of the connecting member 4 in the complicated shape. A part of the second opening 4B close to the first opening 4A is connected from the first opening 4A through a wall surface of the bend 4C bending with a small curvature radius. Thus, the stress tends to concentrate on the wall surface of the bend. The division between the first and second connecting members 40 and 41 is formed away from such a position, in which the stress tends to concentrate. This improves the durability of the connecting pipe 4.

In the specification, as shown in FIG. 10, the uppermost part and the lowermost part of the connecting pipe 4 are referred to as a top 4D and a bottom 4E, respectively, where the exhaust gas purifier 1 including the connecting pipe 4 is mounted to the engine E. Note that, in the present embodiment, the top 4D and the bottom 4E are located near the joint between the first and second connecting members 40 and 41.

—Support—

As shown in FIGS. 10 and 12, the first connecting member 40 includes a support 45 for supporting by face the outer peripheral surface of the three-way catalyst 2.

As shown in FIGS. 5, 9, 10, 11, and 12, the support 45 includes a support part 45A at the first opening and a support part (support surface) 45B at the downstream end surface of the three-way catalyst. The support part 45A supports by face the entire peripheral surface of the three-way catalyst 2 from the first opening 4A toward the downstream end surface 2B of the three-way catalyst 2. The support part 45B extends from the support part 45A at the first opening, and supports the outer peripheral surface of the three-way catalyst 2, which is located opposite to the GPF 3 with respect to the three-way catalyst 2. In FIG. 12, for the purpose of explanation, the boundary between the support part 45A at the first opening and the support part 45B at the downstream end surface of the three-way catalyst is represented by a dashed line.

As shown in FIG. 9, the support 45B at the downstream end surface of the three-way catalyst supports by face the outer peripheral surface of the three-way catalyst 2 in a range in which an angle θ around the central axis L2 of the three-way catalyst 2 is about 190 degrees, when the three-way catalyst 2 is viewed from the left, that is, from the downstream end surface 2B of the three-way catalyst. The angle θ is not limited to this angle. However, the angle θ is 180 degrees or greater in one preferred embodiment, in view of downsizing the exhaust gas purifier 1, improving the performance of the connecting pipe 4 in holding the three-way catalyst 2, and reducing the thermal damage of the three-way catalyst 2.

The outer peripheral surface of the three-way catalyst 2 is supported by face with the support part 45B which is formed in this manner in the connecting pipe 4 and has a sufficient area. This improves the supportability of the three-way catalyst 2, and further reduces the longitudinal size of the catalytic converter Q.

The support part 45B at the downstream end surface of the three-way catalyst supports the three-way catalyst 2. This does not allow the exhaust gas, which has passed through the three-way catalyst 2, to come into contact with the outer peripheral surface, which is supported with the support part 45B at the downstream end surface of the three-way catalyst. This reduces the volume of the part of the three-way catalyst 2 exposed to the exhaust gas, which has passed through the three-way catalyst 2 itself. Accordingly, the reduction of the volume can decrease the thermal damage caused by constant exposure of the three-way catalyst 2 to high-temperature exhaust gas. In particular, the entire outer periphery of the three-way catalyst 2 is covered with the catalyst mat 23 and the catalyst case 24 as described above. This reduces thermal expansion of the catalyst case 24, which is caused by the thermal damage, and eventually, reduces a decrease in the surface pressure of the catalyst mat 23. Such a configuration can also prevent or reduce erosion of the catalyst mat 23 due to a thermal damage, and displacement of the main body of the three-way catalyst 2 from the catalyst mat 23 and the catalyst case 24 when the main body is held.

As shown in FIG. 1, the outer peripheral surface supported with the support part 45B at the downstream end surface of the three-way catalyst is adjacent to the cylinder block E1 of the engine E. In this configuration, the exhaust gas, which has passed through the three-way catalyst 2, does not flow into the cylinder block E1. This reduces heat damage to the outside of the catalytic converter Q.

—First and Second Walls—

As shown in FIGS. 5, 6, 10, and 12, the second connecting member 41 includes a first wall 42 and a second wall 43 for guiding the exhaust gas, which has passed through the three-way catalyst 2, to the GPF 3. As shown in FIG. 5, the first wall 42 faces the downstream end surface 2B of the three-way catalyst 2. The second wall 43 faces the upstream end surface 3A of the GPF 3.

When the connecting pipe 4 is divided into the first and second connecting members 40 and 41 to be molded, the first and second walls 42 and 43 are formed in the second connecting member 41, that is, one of the connecting members. This provides smooth wall surfaces of the walls guiding the exhaust gas, without forming any division. This can reduce turbulence of the flow of the exhaust gas.

As shown in FIGS. 10 and 12, the first wall 42 includes a wall transition 42A, a wall slope 42B, and a wall step 42C. The wall transition 42A smoothly extends forward from the downstream end, which forms the second opening 4B. The wall slope 42B is smoothly connected to the wall transition 42A, and rises up toward the three-way catalyst 2. The rear of the wall step 42C is smoothly connected to the wall slope 42B. The front of the wall step 42C is smoothly connected to the second wall 43 with a curvature radius R3 (a predetermined curvature radius), as shown in FIG. 5.

As shown in FIG. 10, when the connecting pipe 4 is viewed from the second opening 4B so that the first opening 4A is located on the right, the wall transition 42A rises up with a curvature radius R1 from the bottom 4E of the connecting pipe 4. Similarly, the wall step 42C rises up with a curvature radius R2 from the bottom 4E of the connecting pipe 4. Note that, as shown in FIG. 10, the curvature radius R1 of the wall transition and the curvature radius R2 of the wall step are collectively referred to as the curvature radius R of the first wall.

The curvature radius R of the first wall shown in FIG. 10 is here set to be greater than the curvature radius R3 of the second wall shown in FIG. 5.

Figure 15:
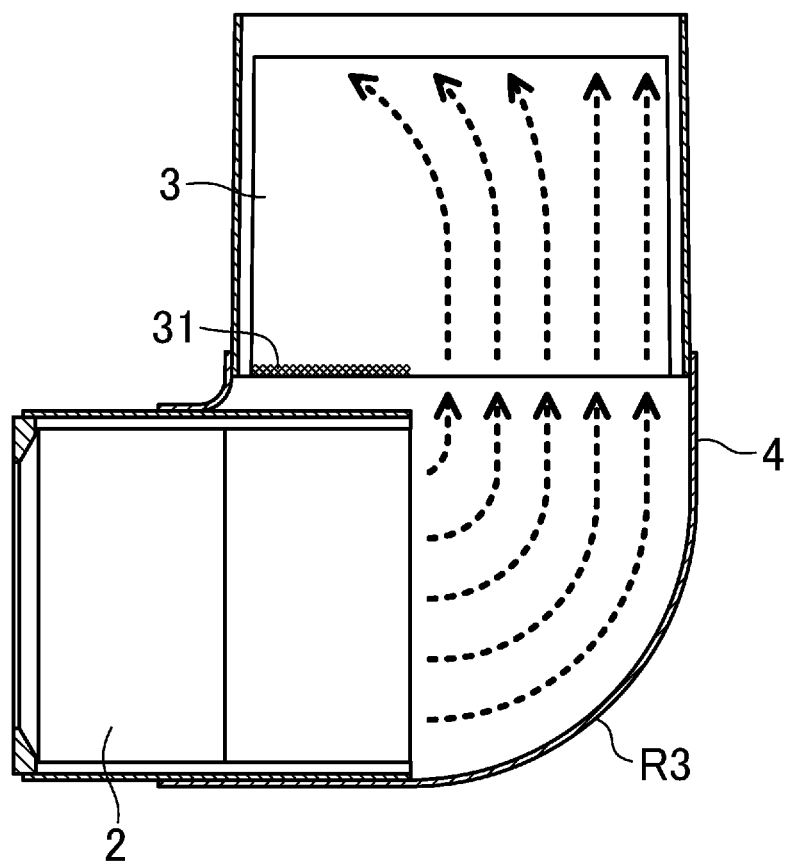
FIG. 15 schematically illustrates a flow of exhaust gas in the arrangement of the three-way catalyst and the GPF shown in FIG. 6, in which a second wall of a bend of the connecting pipe has a great curvature radius.

It is known that a fluid such as exhaust gas tends to flow along a curved surface with a great curvature radius. For example, as shown in FIG. 15, the following case is considered. The bend 4C of the connecting pipe 4 employs a general curved tubular shape. Specifically, the curvature radius R3 of the second wall curves larger and more gently than the curvature radius R of the first wall. In this case, as indicated by the broken arrow in FIG. 15, it is considered that most of the exhaust gas, which has passed through the three-way catalyst 2, directly flows into the GPF 3 along the wall surface, which gently curves with the curvature radius R3 of the second wall. Then, the amount of exhaust gas flowing into the vicinity of the overlap 31 of the GPF 3 decreases, which may reduce the efficiency in using the GPF 3. In addition, in the position where a larger amount of exhaust gas flows, the flow rate of the exhaust gas increases so that the flow resistance may increase to decrease the output.

Figure 6:
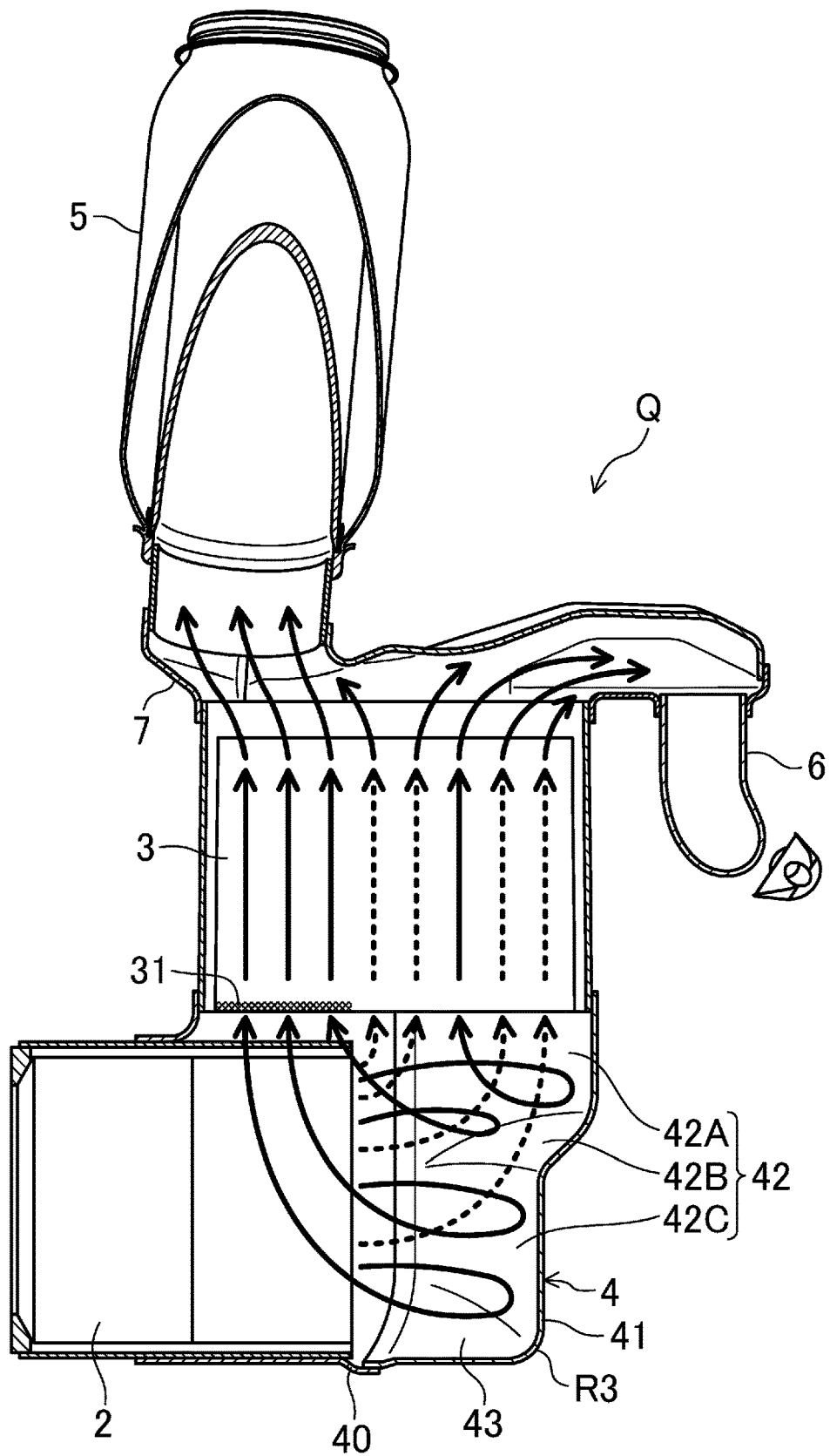
FIG. 6 schematically illustrates a flow of exhaust gas in FIG. 5.
Figure 11:
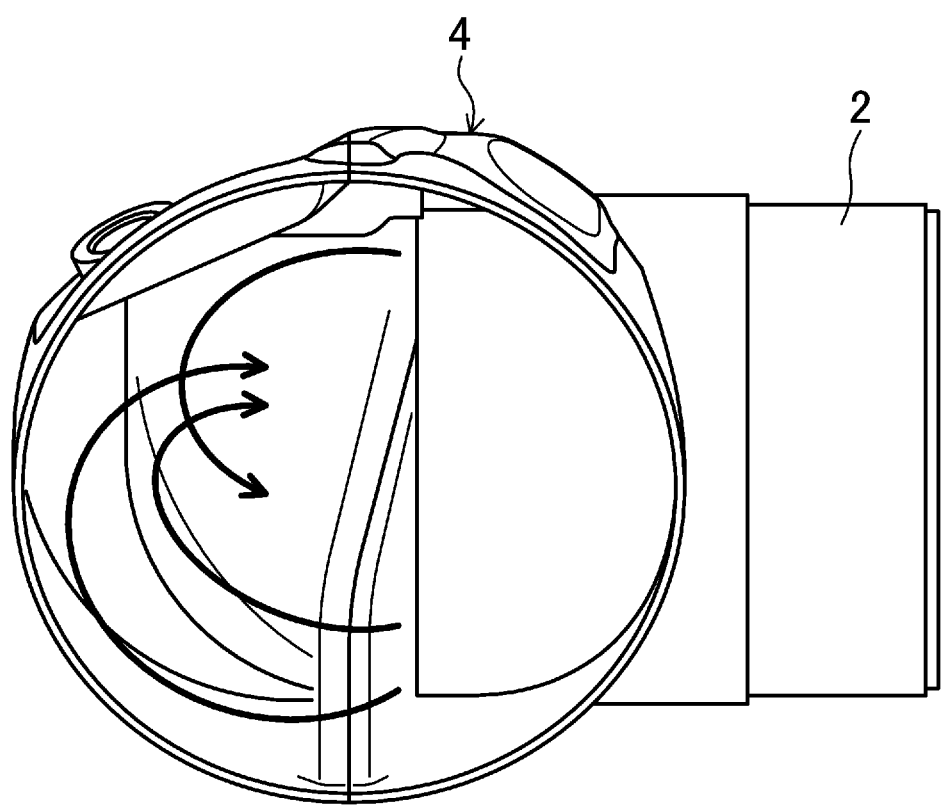
FIG. 11 schematically illustrates a flow of exhaust gas in FIG. 10.

On the other hand, in the exhaust gas purifier 1 according to the present embodiment, the first and second walls 42 and 43 of the bend 4C of the connecting pipe 4 are formed as follows. As shown in FIGS. 5 and 6, the second wall has a small curvature radius R3. As shown in FIGS. 10 and 11, the curvature radius R of the first wall is greater than the curvature radius R3 of the second wall. As shown in FIG. 9, the central axis L2 of the three-way catalyst 3 is shifted downward from the plane PL32, which includes the central axis L3 of the GPF 3 and is parallel to the central axis L2 of the three-way catalyst 2.

Then, as shown in FIG. 6, there is a change in the flow of exhaust gas. That is, the exhaust gas, which has passed through the three-way catalyst 2, is more likely to flow along the surface of the first wall 42 than along the wall surface of the connector between the first wall 42 and the second wall 43. Specifically, as indicated by the broken arrow in FIG. 6, the flow of exhaust gas similar to the flow shown in FIG. 15 decreases. On the other hand, as indicated by the solid-line arrow in FIG. 6, observed is an increase in the flow of exhaust gas reaching the first wall 42, and flowing along the wall surface of the wall transition 42A curving with the curvature radius R1 or of the wall step 42C curving with the curvature radius R2. As described above, as shown in FIG. 9, the central axis L2 of the three-way catalyst is shifted downward from the plane PL32, which is parallel to the central axis L2. Thus, observed is an increase in the flow of exhaust gas flowing along the curved wall surface of the wall transition 42A or the wall step 42C and winding upward from below. In this manner, the secondary flow of exhaust gas, which reaches the first wall 42 and winds up into the space between the three-way catalyst 2 and the GPF 3, is utilized. Then, the flow rate of the whole exhaust gas decreases so that the exhaust gas is diffused into the connecting pipe 4. This increases the amount of exhaust gas flowing into the overlap 31 of the GPF 3. This also decreases the flow resistance of the exhaust gas flowing into the GPF 3, thereby providing a uniform flow of exhaust gas. Eventually, the exhaust device exhibits improved efficiency in using the GPF 3, the function, and the performance.

The wall step 42C of the first wall 42, which is continuous with the second wall 43, protrudes more toward the three-way catalyst 2 than toward the wall transition 42A. As shown in FIG. 6, this reduces the concentrated flow of exhaust gas, which has passed through the three-way catalyst 2 and reaches the wall step 42C, toward the end of the GPF 3, at which the wall transition 42A exists. This also promotes the flow of exhaust gas to the overlap 31.

As shown in FIG. 10, the curvature radius R1 of the wall transition is set to be greater than the curvature radius R2 of the wall step.

It is considered, as indicated by the solid arrow in FIGS. 7, 8, and 11, that the exhaust gas, which has passed through the three-way catalyst 2, reaches the first wall 42, particularly, the wall transition 42A or the wall step 42C, and winds up or winds down along the curved wall surface of the wall transition 42A or the wall step 42C to be diffused into the bend 4C of the connecting pipe 4. At this time, as shown in FIGS. 7 and 8, the curvature radius R1 of the wall transition is greater than the curvature radius R2 of the wall step, that is, the wall transition 42A curves more gently than the wall step 42C. This further reduces the flow rate of exhaust gas near the upstream end surface 3A of the GPF 3. Accordingly, the flow resistance of the exhaust gas flowing into the GPF 3 from the connecting pipe 4 further decreases, and a uniform flow of exhaust gas is provided. Eventually, the efficiency in use, the function, and the performance of the GPF 3 further improve.

As shown in FIG. 8, a base 44 is provided on the top 4D of the connecting pipe 4 and on the second connecting member 41. Control devices such as various sensors including an NOx sensor (detecting means) 92 shown in FIG. 4 are mounted on the base 44. In FIG. 8, for simplicity, the sensor body of the NOx sensor 92 is not shown, and only a mount 92A for NOx sensor for mounting the sensor body is shown.

As described above, the exhaust gas, which has passed through the three-way catalyst 2, is diffused into the connecting pipe 4 and then flows into the GPF 3. At this time, there is little chance the exhaust gas, which has passed through the three-way catalyst 2, directly reaching the top 4D of the connecting pipe 4. At the top 4D, the secondary flow of exhaust gas, which winds up along the wall surface of the first wall 42, diffuses the exhaust gas. Then, near the top 4D of the connecting pipe 4, a sufficient amount of exhaust gas to be used for detecting, for example, the component concentration, temperature, and pressure of the exhaust gas is diffused at a lower flow rate. This arrangement of various sensors near the top 4D of the connecting pipe 4 achieves stable detection accuracy, and improves the mountability of control devices such as various sensors.

Although the base 44 is flat as shown in FIG. 8, note that the shape is not limited thereto. The base 44 may have, for example, a curved surface. Further, the control devices such as various sensors may be provided in a position other than the base 44.

<Downstream End Part of GPF>

Figure 13:
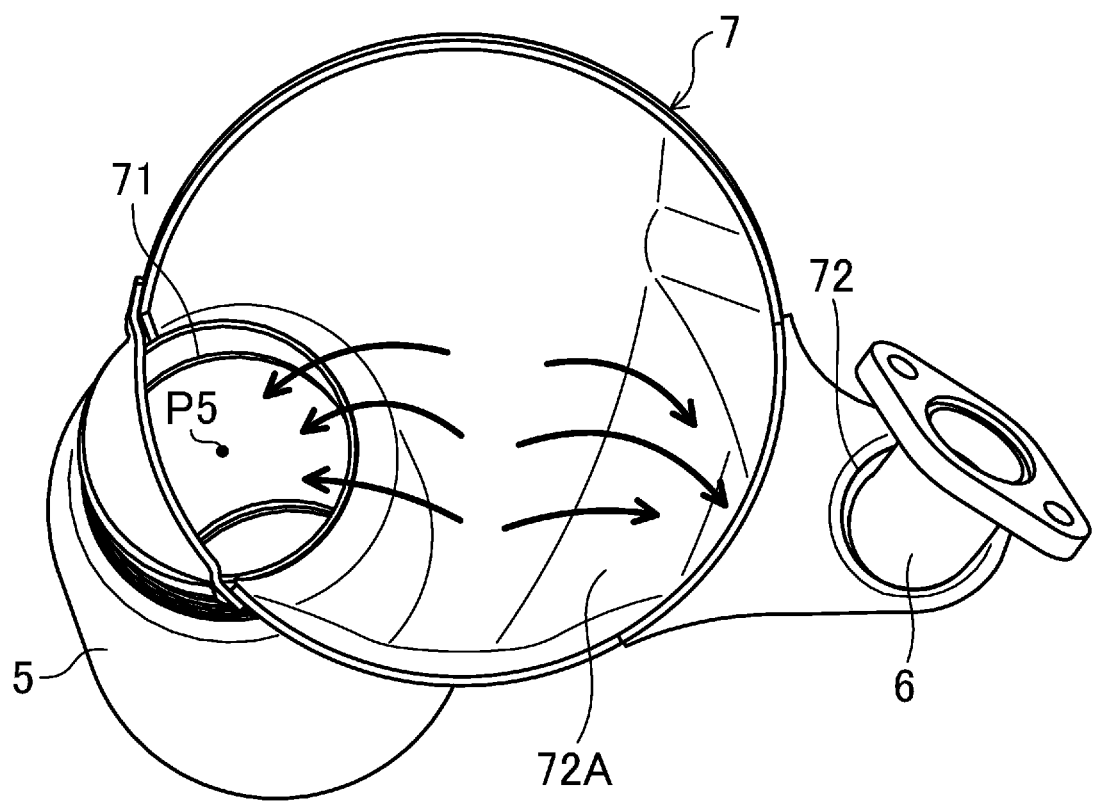
FIG. 13 is a front view of a downstream end part of a GPF.

As shown in FIG. 3, a downstream end part 7 of the GPF is connected to the downstream end of the GPF 3. As shown in FIG. 13, the downstream end part 7 of the GPF is provided with an introduction hole 71 for the exhaust gas outlet, and an introduction port 72 for the EGR. The introduction hole 71 allows for attachment of the exhaust gas outlet 5 that is the outlet of the exhaust gas, which has passed through the GPF 3. The introduction port 72 allows for attachment of the outlet 6 for the EGR that feeds part of the exhaust gas to the intake side.

<Exhaust Gas Outlet>

The exhaust gas outlet 5 is for guiding the exhaust gas, which has passed through the GPF 3, to the downstream exhaust gas passage (not shown). The exhaust gas outlet 5 is also for collecting and removing the moisture generated by the purification of the exhaust gas using the three-way catalyst 2 and the GPF 3.

The line indicated by reference numeral PRL31 shown in FIG. 5 is a projection line of the central axis L3 of the GPF on the V-V cross-section. On the other hand, the line indicated by reference numeral L5 represents the central axis of the exhaust gas outlet 5. The point indicated by reference numeral P5 is located on the central axis L5 of the exhaust gas outlet. The point P5 represents the intersection between the central axis L5 and a plane including the introduction hole 71 for the exhaust gas outlet, which is shown in FIG. 13 and will be described later. That is, the point P5 represents the center of the introduction hole 71 for the exhaust gas outlet, and is hereinafter referred to as the center position P5 of the exhaust gas outlet 5.

As shown in FIG. 5, the center position P5 of the exhaust gas outlet 5, which is close to the downstream end surface 3B of the GPF 3, is offset to the right, that is toward the three-way catalyst 2, from the projection line PRL31 of the central axis L3 of the GPF 3 on the V-V cross-section.

As shown in FIGS. 6 and 13, this configuration causes a flow of the exhaust gas, which has flowed into the GPF 3, toward the exhaust gas outlet 5. Then, with the flow of the exhaust gas toward the exhaust gas outlet 5, the amount of the exhaust gas flowing into the overlap 31 increases. This improves the efficiency in using the GPF 3.

As shown in FIG. 5, the degree of the offset of the exhaust gas outlet 5 is set as follows in one preferred embodiment, in view of obtaining a sufficient amount of exhaust gas flowing into the overlap 31 to improve the efficiency in using the GPF 3. On the V-V cross-section, the right side surface 5A of the exhaust gas outlet 5, which is closer to the three-way catalyst 2, is located on the right of the side surface 3C of the GPF 3, which is closer to the three-way catalyst 2, that is, located closer to the three-way catalyst 2. At this time, the degree of the offset of the exhaust gas outlet 5 is set as follows in one preferred embodiment, in view of reducing an increase in the flow resistance around the exhaust gas outlet 5. On the V-V cross-section, the left side surface 5B of the exhaust gas outlet 5 is located on the left of the side surface 3C of the GPF 3, which is closer to the three-way catalyst 2.

As shown in FIG. 9, the exhaust gas outlet 5 is placed below the plane PL32. This placement of the exhaust gas outlet 5 below the GPF 3 allows for effective collection and removal of the moisture generated at the purification of the exhaust gas using the three-way catalyst 2 and the GPF 3 at the exhaust gas outlet 5.

<Outlet for EGR>

The engine E may employ, as a component, an EGR that recirculates part of exhaust gas to an intake side, for the purpose of preventing or reducing knocking and reducing the amount of nitrogen oxide NOx. In this case, the exhaust gas outlet 6 for the EGR may be provided near the downstream end surface 3B of the GPF 3.

As shown in FIG. 5, the outlet 6 for the EGR is placed opposite to the exhaust gas outlet 5 with respect to the projection line PRL31 of the central axis L3 of the GPF 3 on the V-V cross section. As shown in FIG. 13, the downstream end part 7 of the GPF is provided with an exhaust gas guiding passage 72A for the EGR in a position apart from the introduction hole 71 for the exhaust gas outlet. The exhaust gas guiding passage 72A allows for guiding of the exhaust gas to the introduction port 72 for the EGR.

This configuration can maintain a sufficient amount of exhaust gas for the EGR and diffuse the flow of exhaust gas within the GPF 3 into the exhaust gas outlet 5 and the outlet 6 for the EGR to provide a uniform flow of exhaust gas. Accordingly, the efficiency in use, function, and performance of the GPF3 can further improve.

<In-Vehicle Layout>

Figure 14:
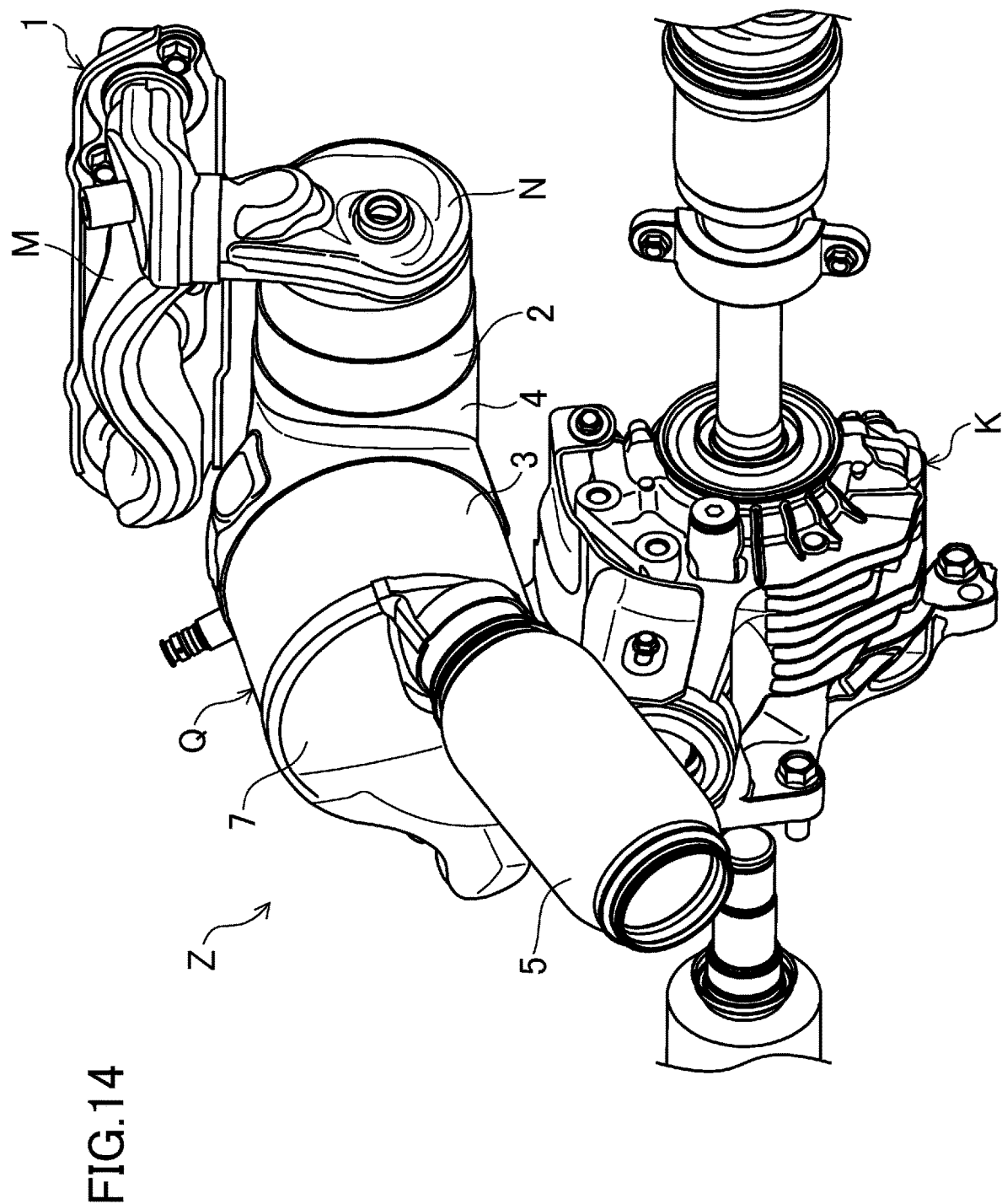
FIG. 14 is a perspective view illustrating a layout of the exhaust gas purifier according to the first embodiment.

The exhaust gas purifier 1 according to the present embodiment may be assembled into, for example, the structure of a vehicle layout Z as shown in FIG. 14.

Specifically, as shown in FIG. 9, the three-way catalyst 2 is provided slightly lower than the GPF 3. Accordingly, as shown in FIG. 14, placing the exhaust manifold M above and close to the three-way catalyst 2 further downsizes the exhaust gas purifier 1 particularly in the longitudinal direction.

As shown in FIGS. 1 and 3, the bottom 4E of the connecting pipe 4 and the bottom 3D of the GPF 3 are formed linearly. As a result, as shown in FIG. 14, a power divider (vehicle component) K is placed below and close to the connecting pipe 4 and the GPF 3. This placement achieves a more compact vehicle layout in the longitudinal, lateral, and vertical directions.

Note that the vehicle component placed below the connecting pipe 4 and the GPF 3 is not limited to the power divider K, and may be any other vehicle component. Specifically, for example, if a drive shaft of a drive system or the exhaust gas purifier 1 is applied to, for example, an FR vehicle; for example, an engine mount of a mount system may be placed close to the connecting pipe 4 and the GPF 3.

Other Embodiments

Now, other embodiments according to the present disclosure will be described in detail. In the description of these embodiments, the same reference characters as those in the first embodiment are used to represent equivalent elements, and the detailed explanation thereof will be omitted.

Although being applied to the FF vehicle, the exhaust gas purifier 1 of the first embodiment is also applicable to an FR vehicle with the following configuration in such a manner; that is, the independent exhaust pipes of the exhaust manifold M, which are connected to the four exhaust ports, are extended rearward and collected to be oriented at the rear end of the engine E toward the center of the vehicle width, and are then further extended rearward.

In the first embodiment, the three-way catalyst 2 serves as the first catalyst, and the GPF 3 serves as the second catalyst. However, the catalysts are not limited thereto, and various catalysts may be used. Specifically, for example, if the exhaust gas purifier 1 is applied to a diesel engine, a diesel particulate filter may be employed. To serve as the first catalyst and the second catalyst, an oxidation catalyst and a catalyst for NOx purification may be combined.

In the first embodiment, as shown in FIG. 9, the three-way catalyst 2 is provided slightly lower than the GPF 3. As shown in FIG. 10, the wall transition 42A and the wall step 42C of the first wall 42 rise up with the curvature radius R1 and the curvature radius R2, respectively, from the bottom 4E of the connecting pipe 4. In this respect, the three-way catalyst 2 may be provided at a level higher than or equal to that of the GPF 3. The wall transition 42A and the wall step 42C of the first wall 42 may fall down with the curvature radius R1 and the curvature radius R2, respectively, from the top 4D of the connecting pipe 4. Alternatively, the wall transition 42A and the wall step 42C may curve from both the top 4D and the bottom 4E of the connecting pipe 4. Instead of the curved shape, a gentle slope such as the base 44 may be provided. In this case, the secondary flow of exhaust gas may be formed along the slope. In any case, the position for mounting the detecting means, such as the base 44 for mounting the sensors, is not limited to the position closer to the top 4D of the connecting pipe 4. The detecting means may be provided as appropriate in a position, such as at the bottom 4E or the first connecting member 40, in which a uniform flow of exhaust gas is obtained.

In the first embodiment, the outlet of the exhaust manifold M is located on the right of the cylinder arrangement. As shown in FIG. 10, the connecting pipe 4 is configured so that the first opening 4A is located on the right, as viewed from the rear. In this respect, the first opening 4A may be arranged in any other position or direction such as the left or the vertical direction, depending on the vehicle layout.

In the first embodiment, the three-way catalyst 2 and the GPF 3 are inserted into the connecting pipe 4. However, these catalysts do not have to be inserted into the connecting pipe 4, and may be connected to the upstream and downstream ends of the connecting pipe 4, for example, via connecting flanges. Alternatively, one of the three-way catalyst 2 and the GPF 3 may be inserted into the connecting pipe 4, and the other may be connected to an end of the connecting pipe 4, for example, via a connecting flange. Note that the configuration of the first embodiment may be employed in one preferred embodiment in view of downsizing the exhaust gas purifier 1.

INDUSTRIAL APPLICABILITY

The present disclosure achieves a reduction in the size of an engine exhaust device, while improving the efficiency in use, function, and performance of a catalyst, and mountability of control devices. Hence, the present disclosure is thus significantly useful.

DESCRIPTION OF REFERENCE CHARACTERS

1 Exhaust Gas Purifier (Engine Exhaust Device)
2 Three-Way Catalyst (First Catalyst)
2A Upstream End Surface of Three-Way Catalyst (Upstream End Surface of First Catalyst)
2B Downstream End Surface of Three-Way Catalyst (Downstream End Surface of First Catalyst)
3 Gasoline Particulate Filter, GPF (Second Catalyst)
3A Upstream End Surface of GPF (Upstream End Surface of Second Catalyst)
3B Downstream End Surface of GPF (Downstream End Surface of Second Catalyst)
3C Side Surface of GPF (Side Surface of Second Catalyst closer to First Catalyst)
3D Bottom of GPF (Bottom of Second Catalyst)
4 Connecting Pipe (Connecting Member)
4A First Opening
4B Second Opening
4C Bend
4D Top
4E Bottom
5 Exhaust Gas Outlet
5A Right Side Surface of Exhaust Gas Outlet
5B Left Side Surface of Exhaust Gas Outlet
6 Outlet for EGR
7 Downstream End Part of GPF 21 Front Stage
22 Rear Stage
23 Catalyst Mat
24 Catalyst Case
31 Overlap
40 First Connecting Member
40A First Joint
41 Second Connecting Member
42 First Wall
42A Wall Transition
42B Wall Slope
42C Wall Step
43 Second Wall
44 Base
45 Support
45A Support Part at First Opening
45B Support Part (Support Surface) at Downstream End Surface of Three-Way Catalyst
71 Introduction Hole for Exhaust Gas Outlet
72 Introduction Port for EGR
72A Exhaust Gas Guiding Passage for EGR
92 NOx Sensor (Detecting Means)
92A Mount for NOx Sensor
Engine
K Power Divider (Vehicle Component)
L2 Central Axis of Three-Way Catalyst (Central Axis of First Catalyst)
L3 Central Axis of GPF (Central Axis of Second Catalyst)
L5 Central Axis of Exhaust Gas Outlet
M Exhaust Manifold
N Connector
P5 Center Position
PRL31 Projection Line
PL32 Plane
Q Catalytic Converter
R Curvature Radius of First Wall
R1 Curvature Radius of Wall Transition
R2 Curvature Radius of Wall Step
R3 Curvature Radius of Second Wall (Predetermined Curvature Radius)
α Dihedral Angle
θ Angle

The invention claimed is:

1. An engine exhaust device comprising:
a first catalyst provided in an exhaust path of the engine to purify exhaust gas discharged from the engine;
a second catalyst placed downstream of the first catalyst in a flow of the exhaust gas to purify the exhaust gas which has passed through the first catalyst; and
a connecting member shaped into a tube and forming a part of the exhaust path, and connecting the first catalyst to the second catalyst, wherein
a downstream end surface of the first catalyst and an upstream end surface of the second catalyst form a dihedral angle within a range from 60 degrees to 120 degrees,
a part of the upstream end surface of the second catalyst is close to and faces a part of a side surface of the first catalyst to form an overlap,
a length of the part of the side surface of the first catalyst is longer than or equal to 10% and shorter than 50% of an entire length of the first catalyst in a central axis direction,
the central axis of the first catalyst and the central axis of the second catalyst are located apart from each other,
the connecting member includes:
 a first opening located upstream in the flow of the exhaust gas;
 a second opening located downstream in the flow of the exhaust gas; and
 a bend connecting the first opening to the second opening,
the bend of the connecting member includes:
 a first wall facing the downstream end surface of the first catalyst; and
 a second wall smoothly connected to the first wall and facing the upstream end surface of the second catalyst,
the first wall includes:
 a wall transition smoothly extending from the second opening;
 a wall slope smoothly connected to the wall transition, and rising up toward the first catalyst; and
 a wall step smoothly connected to the wall slope and the second wall, and
the wall step includes a curvature radius portion, the curvature radius portion being closer to the central axis of the first catalyst than the central axis of the second catalyst and having a curvature radius of the wall step.

2. The device of claim 1, wherein
the central axis of the first catalyst is located below the central axis of the second catalyst, and
the curvature radius portion of the wall step rises up with the curvature radius of the wall step from a bottom of the connecting member.

3. The device of claim 2, wherein
the wall transition includes a curvature radius portion, the curvature radius portion being closer to the central axis of the first catalyst than the central axis of the second catalyst and rising up with a curvature radius of the wall transition from the bottom of the connecting member, and
the curvature radius of the wall transition is greater than the curvature radius of the wall step.

4. The device of claim 3, wherein
the connecting member includes:
 a first connecting member provided with the first opening and a part of the second opening closer to the first opening; and
 a second connecting member provided with the other part of the second opening, and
the first wall and the second wall are provided in the second connecting member.

5. The device of claim 2, wherein
the connecting member includes:
 a first connecting member provided with the first opening and a part of the second opening closer to the first opening; and
 a second connecting member provided with the other part of the second opening, and
the first wall and the second wall are provided in the second connecting member.

6. The device of claim 1, wherein
the connecting member includes:
 a first connecting member provided with the first opening and a part of the second opening closer to the first opening; and
 a second connecting member provided with the other part of the second opening, and
the first wall and the second wall are provided in the second connecting member.

* * * * *